(12) United States Patent
Kanres

(10) Patent No.: US 11,118,716 B2
(45) Date of Patent: Sep. 14, 2021

(54) CURING DEVICE FOR CURING A PIPE LINER

(71) Applicant: INA ACQUISITION CORP., Wilmington, DE (US)

(72) Inventor: Slawomir Kuzniar Kanres, Bialobrzegi (PL)

(73) Assignee: INA Acquisition Corp., Wilmington, DE (US)

( * ) Notice: Subject to any disclaimer, the term of this patent is extended or adjusted under 35 U.S.C. 154(b) by 0 days.

(21) Appl. No.: 16/490,798

(22) PCT Filed: Mar. 2, 2018

(86) PCT No.: PCT/US2018/020675
§ 371 (c)(1),
(2) Date: Sep. 3, 2019

(87) PCT Pub. No.: WO2018/160974
PCT Pub. Date: Jul. 9, 2018

(65) Prior Publication Data
US 2020/0003354 A1     Jan. 2, 2020

(30) Foreign Application Priority Data

Mar. 3, 2017  (PL) .......................................... 420731
Feb. 22, 2018  (DK) .............................. PA201870118

(51) Int. Cl.
*F16L 55/18*     (2006.01)
*B29C 63/00*     (2006.01)
(Continued)

(52) U.S. Cl.
CPC .......... *F16L 55/18* (2013.01); *B29C 63/0004* (2013.01); *B29C 63/34* (2013.01);
(Continued)

(58) Field of Classification Search
CPC .... B29C 2035/0805; B29C 2035/0827; B29C 63/0004; B29C 63/34; B29C 63/36;
(Continued)

(56) References Cited

U.S. PATENT DOCUMENTS

| 5,423,630 A | 6/1995 | Imoto et al. |
| 6,371,631 B1 | 4/2002 | Reutemann |

(Continued)

FOREIGN PATENT DOCUMENTS

| CN | 104154455 A1 | 11/2011 |
| CN | 104112675 A | 10/2014 |

(Continued)

OTHER PUBLICATIONS

International Search Report and Written Opinion for PCT Application No. PCT/US2018/02675, dated Mar. 2, 2018, 15 pages, Korea.

(Continued)

*Primary Examiner* — Philip C Tucker
*Assistant Examiner* — Brian R Slawski
(74) *Attorney, Agent, or Firm* — Stinson LLP

(57) ABSTRACT

A device for curing resin in a pipe liner using electromagnetic radiation includes a heat sink and LEDs for generating the radiation mounted on the heat sink. The device conducts heat away from the LEDs through the heat sink. The heat sink is positioned in the flow path of cooling fluid that draws heat away by convection. The heat sink can include elements at the ends of the LEDs that are exposed to the cooling fluid. The device can guide the cooling fluid along a flow path that includes a segment that extends over the LEDs. The device can limit fluid flow through a central cavity of the heat sink.

18 Claims, 29 Drawing Sheets

(51) Int. Cl.

| | |
|---|---|
| *B29L 23/00* | (2006.01) |
| *B29C 65/00* | (2006.01) |
| *B29C 35/08* | (2006.01) |
| *B29C 65/48* | (2006.01) |
| *B29C 63/34* | (2006.01) |
| *B29C 65/14* | (2006.01) |
| *F16L 55/165* | (2006.01) |
| *F16L 55/26* | (2006.01) |

(52) U.S. Cl.
CPC ...... *B29C 65/1406* (2013.01); *B29C 65/4845* (2013.01); *B29C 66/5221* (2013.01); *B29C 66/612* (2013.01); *B29C 2035/0827* (2013.01); *B29L 2023/22* (2013.01); *F16L 55/165* (2013.01); *F16L 55/26* (2013.01)

(58) Field of Classification Search
CPC ..... B29C 65/14; B29C 65/1406; B29C 65/48; B29C 65/4845; B29C 66/5221; B29C 66/612; B29C 66/632; B29L 2023/22; F16L 55/18; F16L 55/165; F16L 55/1653; F16L 55/26; F16L 2101/10
USPC ............ 156/60, 71, 94, 156, 196, 199, 212, 156/272.2, 275.5, 275.7, 285, 287, 293, 156/294, 307.1, 307.3, 349, 379.6; 138/97, 98; 405/184.2; 257/99, E33.058; 313/11, 33, 35, 36, 45, 46, 498, 500, 512; 362/84, 157, 184, 185, 217.01, 217.1, 362/217.14, 218, 219, 225
See application file for complete search history.

(56) References Cited

U.S. PATENT DOCUMENTS

| | | | |
|---|---|---|---|
| 6,797,741 B1 | 9/2004 | Heino | |
| 7,238,251 B1 | 7/2007 | Driver et al. | |
| 8,192,053 B2 | 6/2012 | Owen et al. | |
| 8,288,451 B2 | 10/2012 | Chen | |
| 9,034,236 B2 | 5/2015 | Xu et al. | |
| 2005/0174780 A1 | 8/2005 | Park | |
| 2010/0051168 A1 | 3/2010 | Moeskjaer et al. | |
| 2010/0327725 A1* | 12/2010 | Huang ................. | F21V 29/767 313/46 |
| 2011/0018417 A1* | 1/2011 | Lai ........................... | F21V 29/76 313/46 |
| 2011/0310631 A1 | 12/2011 | Davis | |
| 2012/0121338 A1 | 5/2012 | Hentschel et al. | |
| 2012/0146503 A1* | 6/2012 | Negley ................... | F21K 9/62 315/35 |
| 2012/0259031 A1 | 10/2012 | Dake et al. | |
| 2012/0281409 A1* | 11/2012 | Patkus ..................... | F21V 29/83 362/249.02 |
| 2013/0010460 A1 | 1/2013 | Peil et al. | |
| 2013/0114263 A1 | 5/2013 | Peil et al. | |
| 2018/0229404 A1* | 8/2018 | Starr .................. | B29C 35/0805 |

FOREIGN PATENT DOCUMENTS

| | | |
|---|---|---|
| DE | 3922351 A1 | 1/1991 |
| DE | 19817413 A1 | 10/1999 |
| DE | 102004028350 A1 | 1/2006 |
| DE | 10122565 B4 | 1/2010 |
| EP | 1959183 A1 | 8/2008 |
| EP | 2129956 A | 4/2011 |
| EP | 2129956 B1 | 4/2011 |
| EP | 1740646 B1 | 3/2016 |
| EP | 3236129 A1 | 10/2017 |
| EP | 3321554 A1 | 5/2018 |
| EP | 3336404 | 6/2018 |
| EP | 3346175 A1 | 7/2018 |
| JP | 1998109362 A | 8/1998 |
| JP | 2008265245 | 11/2008 |
| PL | 202527 B1 | 7/2009 |
| WO | 8704226 A | 7/1987 |
| WO | 1992016784 A1 | 10/1992 |
| WO | 199315131 A1 | 8/1993 |
| WO | 200017565 A1 | 3/2000 |
| WO | 200118444 A1 | 3/2001 |
| WO | 2001018444 A1 | 3/2001 |
| WO | 2001061236 A2 | 8/2001 |
| WO | 2001088338 A1 | 11/2001 |
| WO | 2004020893 A1 | 3/2004 |
| WO | 2004104469 A1 | 12/2004 |
| WO | 2005049138 A1 | 6/2005 |
| WO | 2005103121 A1 | 11/2005 |
| WO | 2006101526 A1 | 9/2006 |
| WO | 2013184090 A2 | 12/2013 |
| WO | 2016052495 A1 | 7/2016 |

OTHER PUBLICATIONS

International Preliminary Report on Patentability, Application No. PCT/US2018/020675, dated Sep. 12, 2019, pp. 11.
Mitchell, Susan, Selecting UV-Curing Equipment for Wood and Building Products Applications, Radtech Report, May/Jun. 2006, 6 pages.
Compositesworld, Techonologies for UV curing of composite laminates demonstrated, 2004, 8 pages, https://www. Dompositesworld.com/articles/techonologies-for-uv-curing-of-composite-laminates-demonstrated.
Drake, et al., LED Curing Versus Conventional UV CUring Systems: Property Comparisons of Acrylates and Epoxies, 2004, 6 pages, ©RadTech el5 2004 Technical Proceedings.
DSM Composite Resins—Blue LED for Relining—Jan. 17, 2006, 13 pages.
DSM Composite Resins—Blue LED History, Apr. 11, 2006, 6 pages.
DSM Composite Resins—Blue LED-cure for Relining—Why?, Sep. 19, 2005, 19 pages.
Ernst, LED Curing of CIPP, Apr. 9, 2017, 10 pages, Bluelight GmbH, Stuttgart, AO of Aarsleff Rohrsanierung GmbH, Nuernberg, Germany.
Ernst, Power Point Presentation entitled LED Curling of CIPP for the NASTT's 2017 No-Dig Show, 2017, 24 pages.

\* cited by examiner

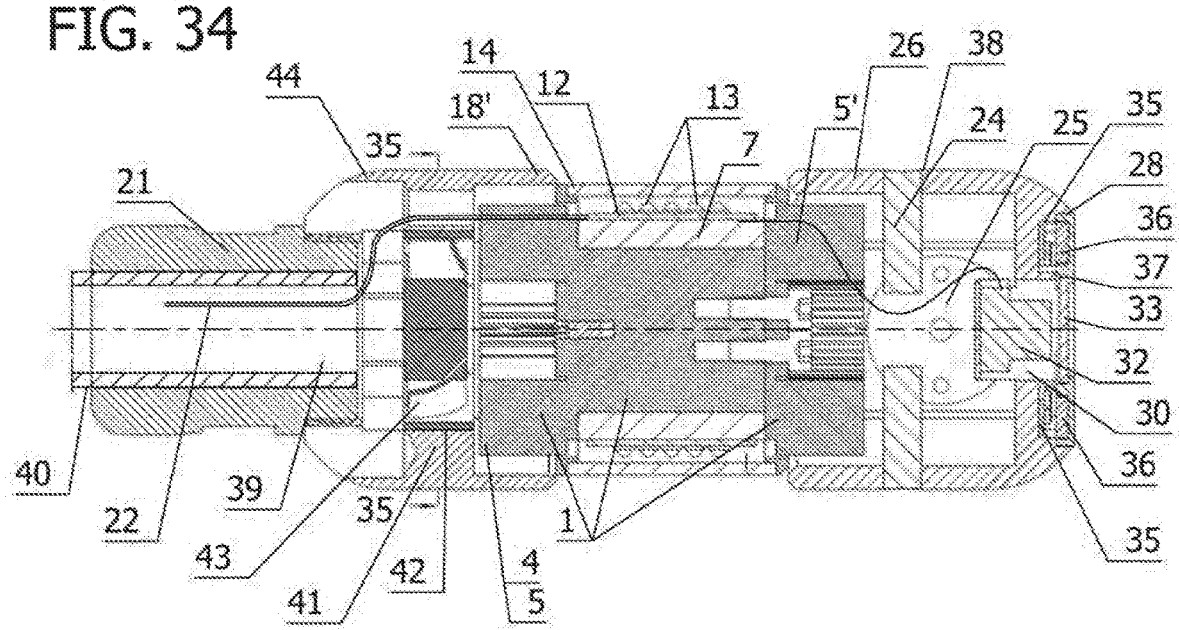
FIG. 34
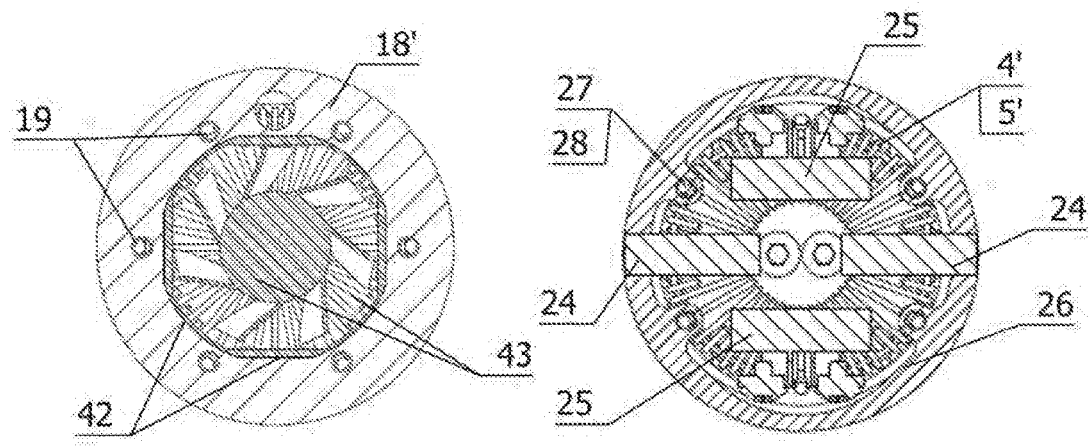
FIG. 35
FIG. 36
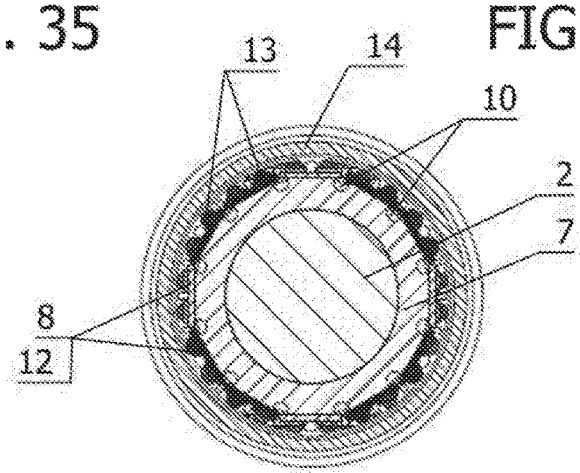
FIG. 37

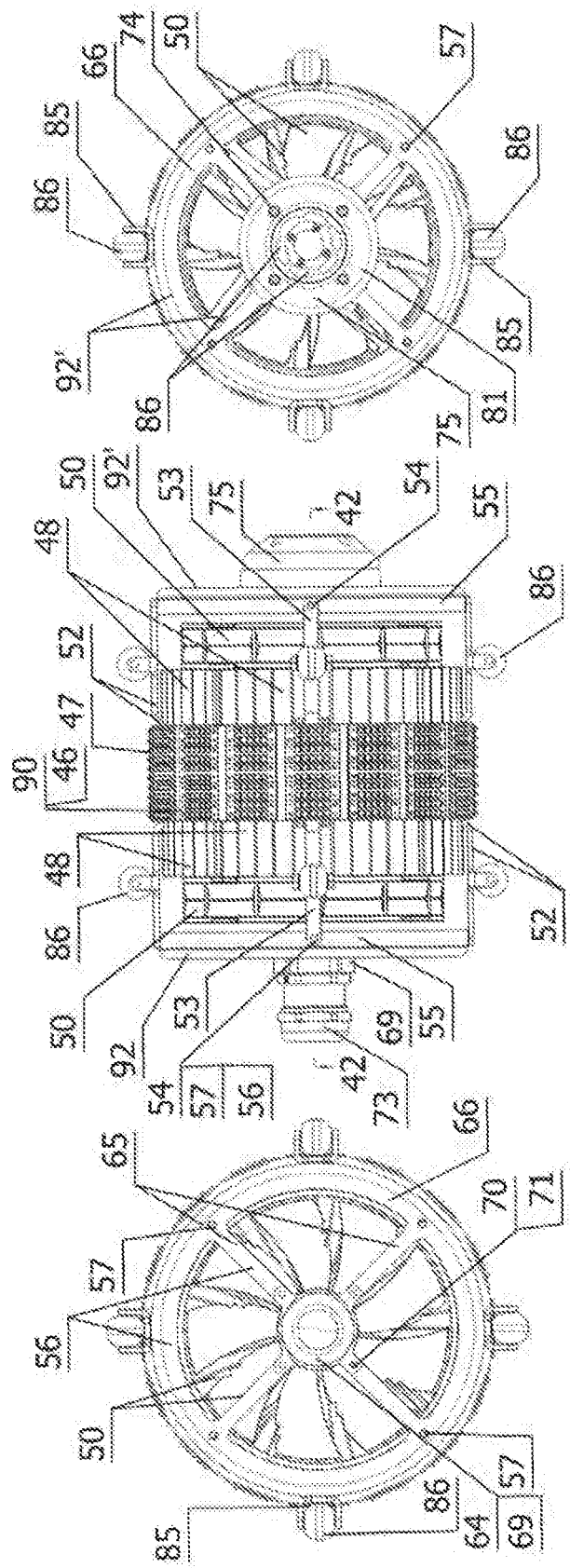

CURING DEVICE FOR CURING A PIPE LINER

CROSS-REFERENCE TO RELATED APPLICATION

This application claims priority to Polish Patent Application No. 420731, the disclosure of which is included in its entirety in this application.

FIELD

The present disclosure generally relates to a curing device for curing pipe liners and more specifically to a light emitting diode (LED) device for directing electromagnetic radiation toward curable material impregnating a cured in place pipe (CIPP) liner.

BACKGROUND

Worn and leaky pipes, referred to as host pipes, can be renovated using CIPP liners that are cured to form a new pipe within the old host pipe. In general, the CIPP lining process includes positioning a resin-impregnated liner inside a host pipe and pressing the liner into contact with the interior of the host pipe. After the liner is properly positioned in the host pipe, the resin is cured so that the liner forms a new pipe inside the host pipe.

Various techniques for positioning a CIPP liner in a host pipe are known. Polish Patent Publication No. PL202527, for example, discloses a procedure and assembly for rehabilitating a host pipe in which a liner is inserted and pressed against the inner surface of the host pipe by expansion rings. Clamps affix the ends of the liner in place. Other resin-impregnated pipe liners are configured to be positioned within an existing host pipe by eversion. International Patent Application Publication No. WO 2004/104469 described still another procedure in which a resin-impregnated liner is pulled into a host pipe and inflated into contact with the interior of the host pipe.

After positioning a liner in the host pipe, the resin is cured. Conventionally the resin is a thermosetting resin that is cured by forcing hot water or steam through the liner inside the host pipe. International Patent Applicant Publication No. WO 93/15131 describes an alternative method of sonic energy to harden the resin impregnating the liner. Specifically, a device equipped with an ultrasonic emitter is inserted into the liner. The device emits ultrasound as it is moved along the length of the liner. The resin is configured to be cured by the ultrasound as the device moves through the liner. The use of microwave radiation to effect curing is also described. Another method of curing a resin impregnating a CIPP liner involves directing UV radiation to a liner impregnated with a resin configured to for curing in the presence of UV radiation. Conventionally, UV radiation is provided by a vacuum electron tube mounted on a robot that moves along the length of the inside of the liner during curing. UV radiation, however, can be hazardous to human operators. In other CIPP lining methods, such as those described in International Patent Application Publication No. WO2005/103121, the liner is impregnated with resin that is curable when illuminated by visible light, for example, light of a wavelength of roughly 450 nm (blue light). European Patent No. EP 2 129 956 B1 describes embodiments of curing devices comprising LEDs configured to emit electromagnetic radiation (e.g., visible light or ultraviolet radiation) that is suitable for curing resin impregnating a CIPP liner. In contrast to vacuum electron tubes, LEDs have a more stable radiation output and largely constant energy consumption. However, LEDs generate a significant amount of heat that can adversely affect efficiency. The devices disclosed in EP 2 129 956 are configured to cool the LEDs using a cooling fluid.

SUMMARY

In one aspect, a curing device for curing a material impregnating a pipe liner that is curable by electromagnetic radiation in a wavelength range comprises a housing having an axis, a distal end portion and a proximal end portion spaced apart along the axis, and a side wall extending along and about the axis between the distal and proximal end portions and defining an interior chamber disposed between the distal and proximal end portions. The side wall is at least partially transparent to electromagnetic radiation in the wavelength range. The housing defined a cooling fluid inlet and a cooling fluid outlet that are each configured to provide fluid communication between the interior chamber and a location external to the housing. At least one light emitting diode (LED) is configured for transmitting electromagnetic radiation in the wavelength range and supported in the interior chamber of the housing for transmitting the electromagnetic radiation through the side wall to the liner. A heat sink comprises thermally conductive material disposed in the interior chamber of the housing. The heat sink is positioned within the interior chamber so that the heat sink and the housing define a fluid flow path that extends from the cooling fluid inlet to the cooling fluid outlet and includes at least a segment that is located between the heat sink and the housing. The heat sink is thermally coupled to the LED for transferring heat generated by the LED to the cooling fluid flowing along the fluid flow path.

In another aspect, a method for curing a pipe liner impregnated with a material that is curable by electromagnetic radiation in a wavelength range comprises positioning a curing device in an interior of the liner. The curing device, having a housing positioned in the interior of the liner, is moved along a length of the liner. During the step of moving the curing device, electromagnetic radiation having a wavelength in the wavelength range is emitted through the housing toward the liner from a light emitting diode (LED) of the curing device received in an interior chamber of the housing. During the step of emitting the electromagnetic radiation from the LED, heat is removed from the LED by conveying the heat from the LED to a cooling fluid through a heat sink of the curing device on which the LED is mounted in the interior chamber of the housing. During the steps of emitting the electromagnetic radiation from the LED and removing heat from the LED, the cooling fluid is delivered into the interior chamber of the housing through an inlet formed in the housing, out of the interior chamber of the housing through an outlet formed in the housing at a location spaced apart from the inlet, and from the inlet to the outlet along a fluid flow path including at least a portion positioned between the housing and the heat sink.

In another aspect, a curing device for curing a material impregnating a pipe liner that is curable by electromagnetic radiation in a wavelength range comprises a housing having an axis, a distal end portion and a proximal end portion spaced apart along the axis, and a side wall extending along and about the axis between the distal and proximal end portions and defining an interior chamber disposed between the distal and proximal end portions. The side wall is at least partially transparent to electromagnetic radiation in the wavelength range. The housing defines a cooling fluid inlet and a cooling fluid outlet that are each configured to provide fluid communication between the interior chamber and a location external to the housing. Light emitting diodes (LEDs) are configured for transmitting electromagnetic radiation in the wavelength range and supported in the interior chamber of the housing for transmitting the electromagnetic radiation through the side wall to the liner. A heat sink comprises thermally conductive material disposed in the interior chamber of the housing. The heat sink includes an LED supporting portion. The LEDs are disposed on the LED supporting portion and in thermal communication with the heat sink. The heat sink is positioned within the interior chamber so that the heat sink and the housing define a fluid flow path that extends from the cooling fluid inlet to the cooling fluid outlet. The heat sink includes a first heat sink element axially spaced from the LED supporting portion and the LEDs disposed thereon. The first heat sink element has passaging therein for receiving cooling fluid flowing along the fluid flow path. The LED mounting portion is free of passaging in fluid communication with the fluid flow path.

Other aspects will be in part apparent and in part pointed out hereinafter.

BRIEF DESCRIPTION OF THE DRAWINGS

FIG. 34 is a section taken in the plane of line 34-34 of FIG. 29;

FIG. 35 is a section taken in the plane of line 35-35 of FIG. 34;

FIG. 36 is a section taken in the plane of line 36-36 of FIG. 29;

FIG. 37 is a section taken in the plane of line 37-37 of FIG. 29;

FIG. 38 is a top plan view of another embodiment of a curing device;

FIG. 39 is a distal end elevation of the curing device of FIG. 38;

FIG. 40 is a proximal end elevation of the curing device of FIG. 38;

Corresponding reference characters indicate corresponding parts throughout the drawings.

DETAILED DESCRIPTION

Figure 1:
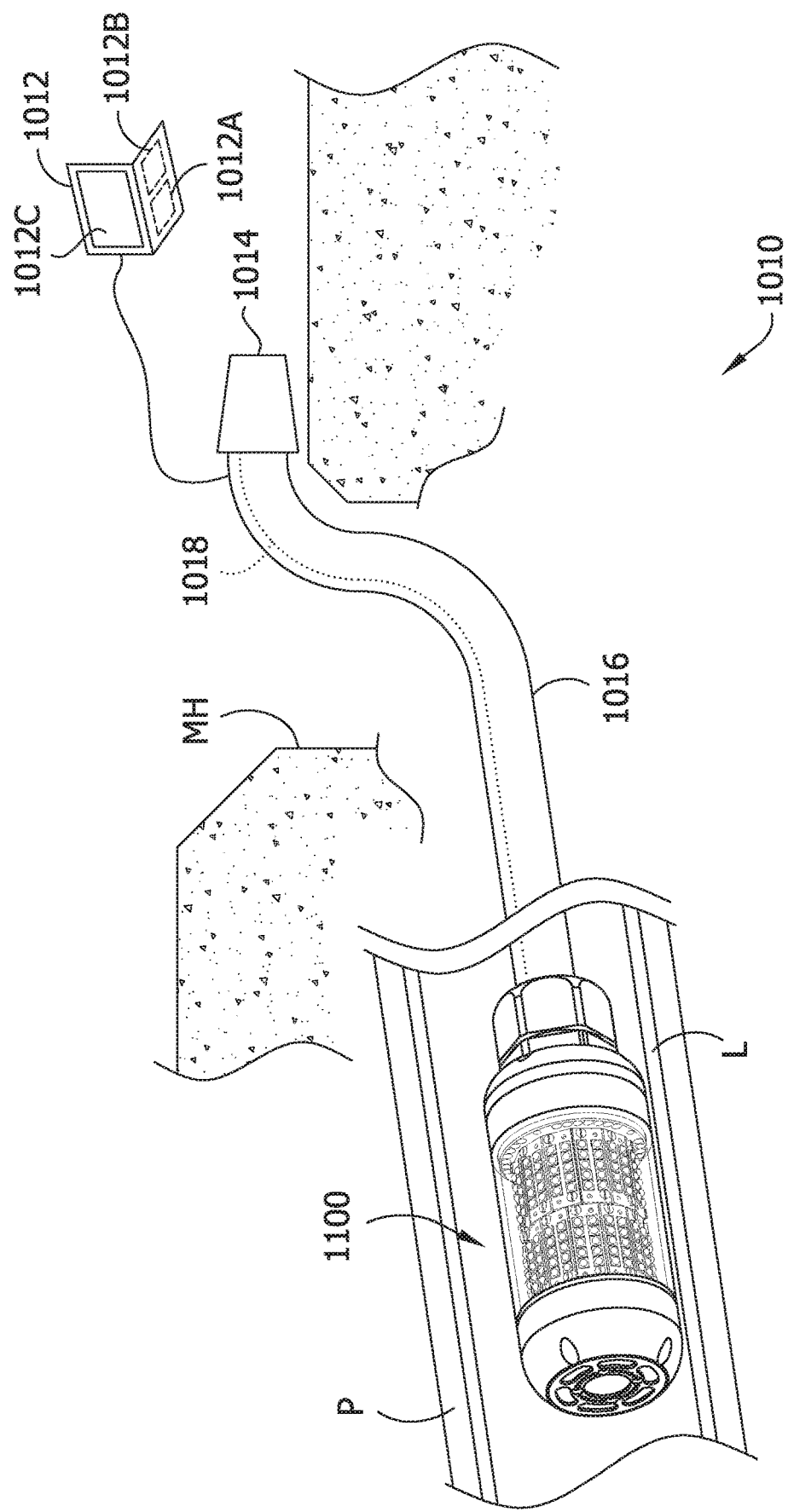
FIG. 1 is a schematic illustration of a CIPP liner curing system at a host pipe lined with an uncured liner.

Referring to FIG. 1, one embodiment of a system for curing resin (broadly, a curable material) impregnating a CIPP liner L positioned in a host pipe P is generally indicated at reference number 1010. The system 1010 includes a control device 1012, an air compressor 1014, a flexible conduit 1016, and an LED curing device, generally indicated at 1100, and described in further detail below. In one application of the curing system 1010, the curing device 1100 is used in a host pipe P positioned underground to cure a liner L comprising felt impregnated with resin configured to cure in the presence of electromagnetic radiation having a wavelength in an inclusive range of from about 200 nm to about 900 nm. The system 1010 can also be used to cure curable material in a CIPP liner L that cures at other wavelengths in other embodiments. Likewise, liners L formed of resin-impregnable materials other than or in addition to felt can be cured with the system 10, and/or the system can be used to cure CIPP liners in host pipes P positioned elsewhere besides underground. Various techniques for positioning the uncured liner L in the host pipe P are known to those skilled in the art of CIPP lining, and any suitable technique can be used without departing from the scope of the invention.

As will be explained in greater detail below, the LED curing device 1100 is configured to direct electromagnetic radiation toward the liner L from a location inside the liner L. The LED curing device 1100 is constructed to emit electromagnetic radiation that impinges upon the entire circumference of the liner at the location of the LED curing device. The flexible conduit 1016 extends from a proximal end adjacent a manhole MH (broadly, an access point to the host pipe P) to an opposite distal end that is attached to the curing device 1100. The curing device 1100 is attached to the distal end of the conduit 1016 and configured move conjointly with the conduit through the liner L and host pipe P. For example, when the conduit 1016 is inserted distally from the manhole MH into the interior of the liner L, the curing device 1100 travels through the liner with the conduit in a distal direction. Similarly, when the conduit 1016 is pulled proximally along the liner L, the curing device 1100 travels with the conduit in a proximal direction. In the illustrated embodiment, the curing device 1100 is configured to freely slide along the interior surface of the liner L. In other embodiments, the curing device can comprise wheels (e.g., mounted for rotation on a carriage that centers the curing device in the liner L) that roll along the liner to guide movement of the curing device 1100 during use. The curing device can move along the interior of the liner L in still other ways in other embodiments. Although the illustrated curing device 1100 is configured to be moved along the liner L by movement of a conduit 1016, other embodiments can include a drive mechanism that is positioned inside the liner during use.

The conduit 1016 is configured to carry a cooling fluid (e.g., compressed air) from the compressor 1014 (broadly, a cooling fluid source) to the curing device 1100 to prevent the curing device from overheating as explained below. Although the illustrated embodiment uses compressed air as a cooling fluid, it will be understood that other embodiments can use other types of cooling fluids. In addition, though the illustrated embodiment supplies the cooling fluid to the curing device 1100 from a location outside of the liner L, other embodiments can include sources of cooling fluid located inside the liner. For example, the curing device could include an onboard blower or ventilator configured to drive air from the interior of the liner through the curing device.

In the illustrated embodiment, a signal carrier 1018, such as one or more electrically conductive wires and/or one or more fiber optic filaments, extends along the conduit 1016 from the user interface device 1012 to the curing device 1100. The signal carrier 1018 can extend inside the lumen of the conduit 1016 that carries the cooling fluid, through another lumen defined in the conduit, or along an exterior of the conduit without departing from the scope of the invention. In certain embodiments, the signal carrier 1018 is configured to carry power from a power supply (not shown) located adjacent the access point MH to the curing device 1100. In other embodiments, the curing device 1100 could be powered by an onboard power supply (e.g., a battery) or a power supply at another location. In one or more embodiments, the signal carrier 1118 is configured to carry data signals (e.g., sensor signals, control signals, etc.) between the curing device 1100 and the user interface 1012. For example, as explained below, the signal carrier 1118 can be configured to transmit an image signal from the curing device 1100 to the user interface device 1012.

Suitably, the user interface device 1012 includes a memory 1012A storing processor-executable software, a processor 1012B operatively connected to the memory for executing the software, and a display 1012C operatively connected to the processor for displaying images to a technician as directed by the processor. It will be understood that aspects of the curing system 1010 that are described as being implemented using the memory 1012A and the processor 1012B can also be implemented on other memory device(s) and/or other processor(s) (e.g., memory device(s) and/or processor(s) located remote from the manhole MH, etc.) in other embodiments. Moreover, the curing device 1100 may be monitored and/or controlled by way of the internet.

In the illustrated embodiment, the user interface device 1012 is configured to receive an image signal (e.g., a video signal) from the curing device 1100 (device acquisition of the image signal is discussed in greater detail below). As directed by software stored on the memory 1012A, the processor 1012B stores data from the image signal on the memory and displays, for example, a real time video based on the image signal on the display 1012C. A technician can use the video displayed on the display 1012C to, for example, evaluate the rate at which to move the curing device 1100 along the liner L, evaluate the intensity at which to direct electromagnetic radiation from the curing device toward the liner, etc. It is understood that signals other than image signals can be transmitted from the curing device 1100 to the user interface 1012 and that representations of such signals can also be displayed on the display 1012C for use by the technician or for use in other ways.

In certain embodiments, the software stored on the memory 1012A can include control software that configures the processor 1012B to generate control signals for controlling the curing device 1100. In one embodiment, the software, when executed by the processor 1012B, is configured to automatically determine a control output based on input signals received from the curing device 1100. For example, the software can configure the processor 1012B for determining a rate at which the curing device 1100 should be moved through liner L, and/or an intensity at which the curing device should direct electromagnetic radiation to the liner. In one or more embodiments, the software can configure the processor to provide an indication of the determined control output to the technician, e.g., by displaying an indication of the control output on the display. In other embodiments, the processor can be operatively connected to an output device (e.g., s driver (not shown) for driving movement of the curing device 1100 along the length of the liner L, a regulator (not shown) for controlling the intensity of electromagnetic radiation output from the curing device, etc.) for automatically providing a control signal to the output device operative to adjust the output device in accordance with the determined control output.

Referring to FIGS. 2-5, the illustrated curing device 1100 includes a housing, generally indicated at 1110, that encloses a plurality of LED strips, generally indicated at 1112. As explained below, the LED strips 1112 are mounted on a heat sink, generally indicated at 1114, in thermal communication with the heat sink. The LED strips 1112 are configured to direct electromagnetic radiation toward the resin impregnated liner L for curing the liner during use. As the LED strips 1112 generate electromagnetic radiation, they generate heat. As described below, the illustrated curing device 1100 is configured to remove the heat generated by the LED strips 1112 by transferring the heat through the heat sink 1114 to air provided by the air compressor 1014 that flows along a flow path FP through an interior chamber 1118 the housing 1110.

The housing 1110 extends along an axis A and includes a distal end assembly 1120 forming a distal end portion of the housing and a proximal end assembly 1122 spaced apart from the distal end assembly along the axis and forming a proximal end portion of the housing. As described in further detail below, a side wall 1124 extends along the axis A of the housing 1110 and, with the distal and proximal end assemblies 1120, 1122, defines the interior chamber 1118. The interior chamber is disposed between the proximal and distal end portions of the housing 1110. As described further below, the housing 1110 defines a cooling fluid inlet 1130 (FIG. 5) and a cooling fluid outlet 1156 that are spaced apart from one another and configured to provide fluid communication between the interior chamber 1118 and locations external to the housing. The housing 1110 is generally configured to substantially seal the fluid flow path FP against the ingress of fluids into or out of the chamber 1118 except through the cooling fluid inlet 1130 or the cooling fluid outlet 1156. Thus, in use, the housing 1110 is shaped and arranged to channel the cooling fluid along the fluid flow path FP from the cooling fluid inlet 1130 to the cooling fluid outlet 1156.

The illustrated proximal end assembly 1122 includes a proximal end cap 1126 and a conduit fitting 1128 mounted on the proximal end cap. The conduit fitting 1128 is configured to fluidly couple the curing device 1100 to the distal end portion of the cooling fluid conduit 1016. The proximal end cap 1126 and the conduit fitting 1128 are shaped and arranged to define a channel 1130 (FIG. 5) through the proximal end portion of the housing 1110. As explained below, the channel 1130 forms the cooling fluid inlet through which cooling fluid is delivered into the interior chamber 1118 of the housing 1110. In the illustrated embodiment, the proximal end cap 1126 includes a housing connector 1132. The housing connector 1132 operatively connects the signal carriers 1018 extending through the conduit 1016 to the curing device 1100.

Figure 4:
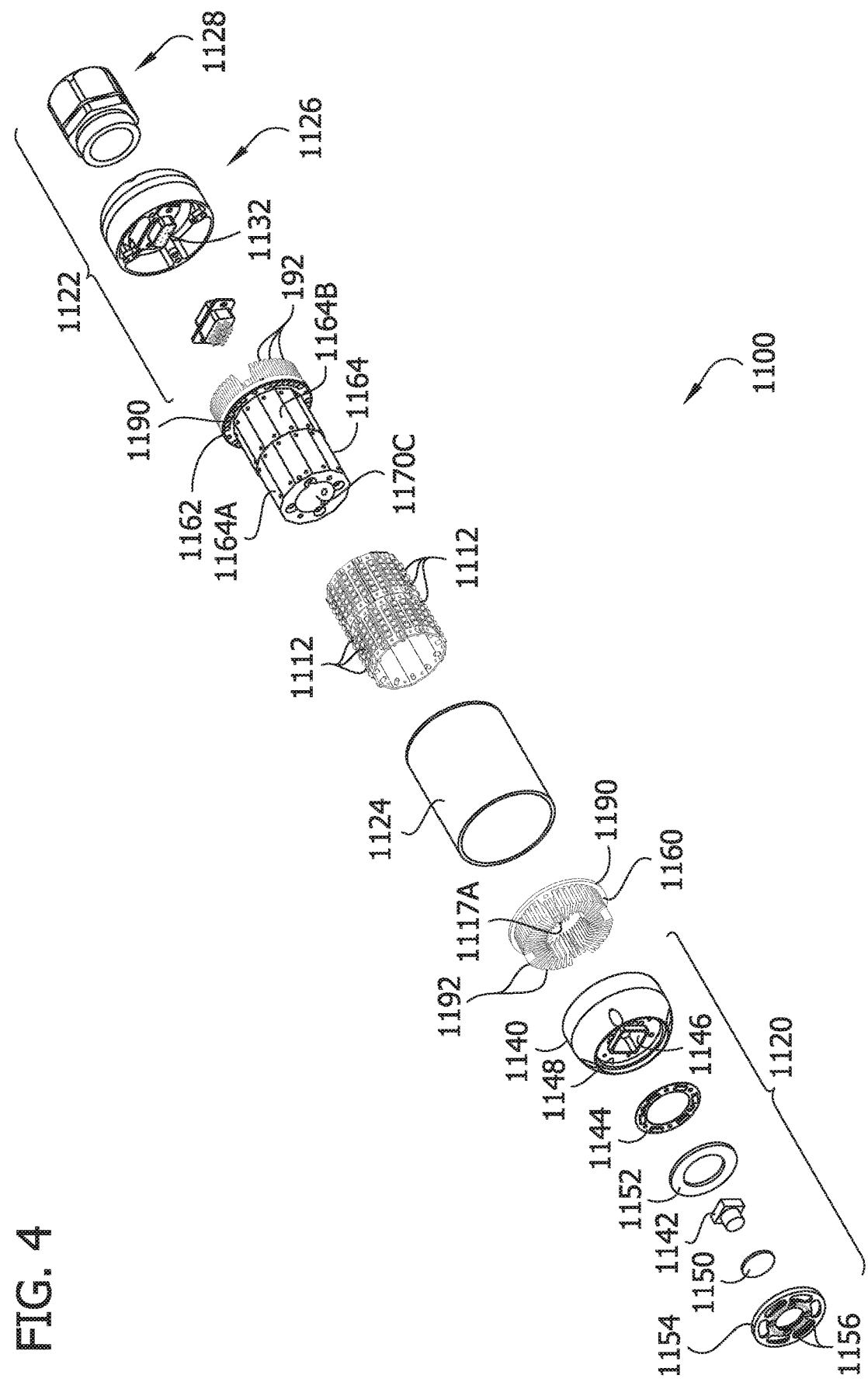
FIG. 4 is an exploded perspective of the curing device.
Figure 5:
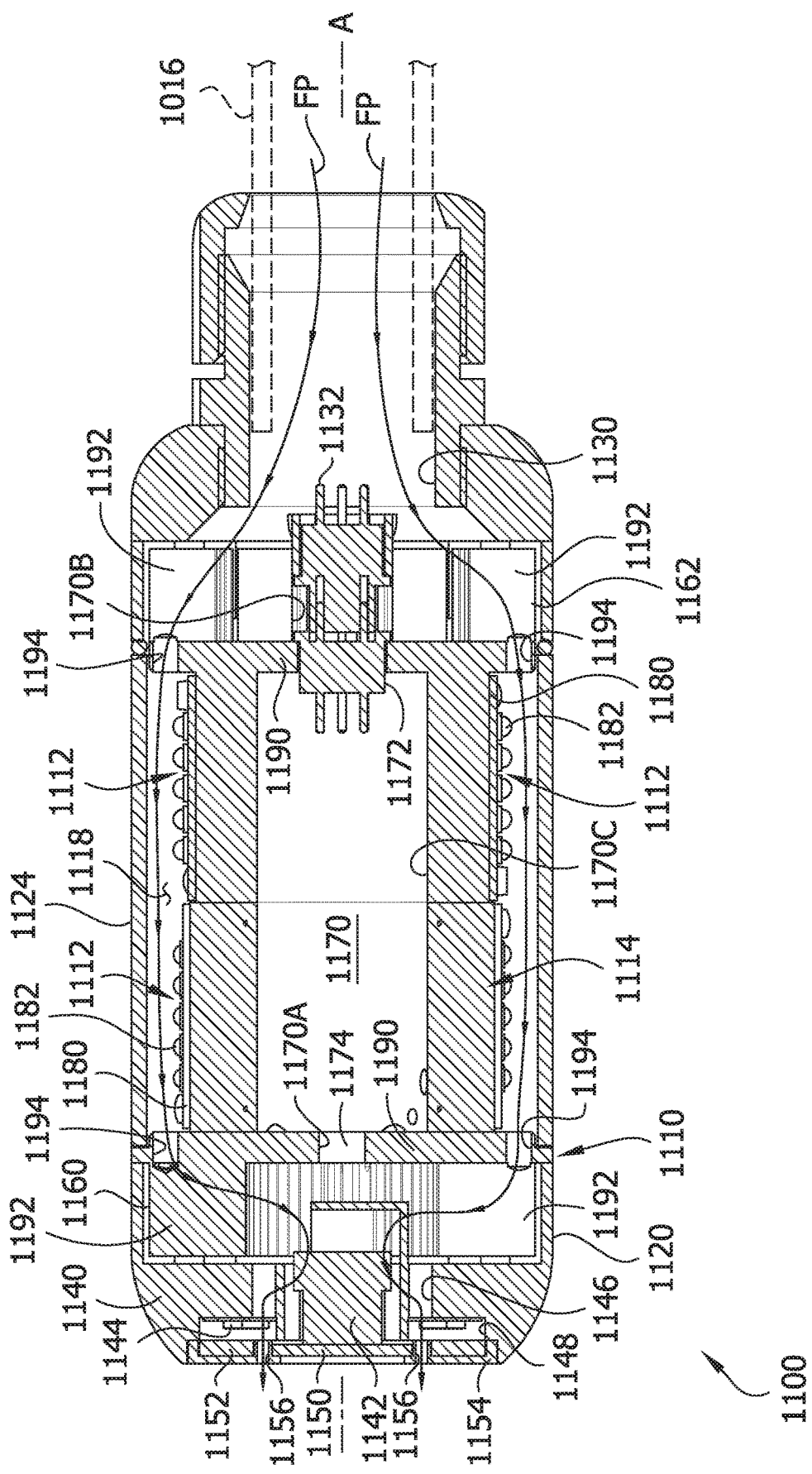
FIG. 5 is a longitudinal section of the curing device schematically illustrating a cooling fluid flow path defined therein.

The distal end assembly 1120 of the housing 1110 comprises a distal end cap 1140 that is configured to support one or more sensors of the curing device 1100. In the illustrated embodiment, the distal end cap 1140 is configured to support a image capture system comprising a camera 1142 and an annular LED fixture 1144 (broadly, a light fixture) that illuminates areas imaged by the camera. It will be understood that other curing devices can include other sensors mounted on a distal end cap or at other locations on the device for sensing parameters relating curing of the liner. The illustrated distal end cap 1140 defines a central opening 1146 extending through the end cap along the axis A and a distal annular 1148 recess extending circumferentially around the central opening. The annular LED fixture 1144 is positioned in the recess 1148 and attached the end cap 1140 in an orientation for directing light generally along the axis A in a distal direction to illuminate the interior of the liner L. The camera 1142 is mounted on the distal end cap 1140 in the central opening 1146 and faces distally to capture images of the illuminated interior of the liner L during use. As shown in FIG. 1, the signal carrier 1118 carries image signals from the camera 1142 to the user interface 1012, and the user interface displays real-time video or near real-time images from the camera on the display 1012C during use. Referring to FIGS. 4 and 5, protective lenses 1150, 1152 (formed from, e.g., quartz) are positioned in front of the camera 1142 and LED fixture 1144, respectively, and a distal end piece 1154 is attached to the distal end of the cap 1140 to hold the protective lenses in place.

The distal end cap 1140 is also configured to define a segment of the flow path FP along which cooling fluid flows through the curing device 1100. In the illustrated embodiment, the camera 1142 is positioned to permit cooling fluid to pass along the flow path FP through the central opening 1146 around the perimeter of the camera. In addition, the end piece 1154 defines a plurality of axial holes 1156 (FIG. 2) that are angularly spaced about the axis A and arranged in fluid communication with the central opening 1146 in the distal end cap 1140. In the illustrated embodiment, the holes 1156 define the cooling fluid outlet of the curing device 1100. It will be understood that curing devices can have cooling fluid outlets of other configurations in other embodiments.

The side wall 1124 of the housing 1110 extends circumferentially around the axis A and extends along the axis A between the distal end assembly 1120 and the proximal end assembly 1122. In the illustrated embodiment, the side wall is tubular in shape, but other side walls can have other configurations in other embodiments. For example, the side wall may be formed from several pieces. In the illustrated embodiment, the entire side wall 1124 is formed of an impact resistant material that is transparent to electromagnetic radiation of the wavelength that the LED strips 1112 transmit. Thus, the side wall 1124 forms a window through which the LED strips 1112 transmit electromagnetic radiation to the liner L in use. In other embodiments, the curing devices can have housings defining windows of other configurations for passing electromagnetic radiation. In the illustrated embodiments, each LED strip contains multiple LEDs. Any number of LEDs may be used, including only a single LED.

The heat sink 1114 comprises thermally conductive material (e.g., copper, aluminum, etc.) disposed in the interior chamber 1118 of the housing 1110. As shown in FIGS. 4 and 5, the illustrated heat sink 1114 includes a distal heat sink element 1160 that forms a distal end portion of the heat sink, a proximal heat sink element 1162 that forms a proximal end portion of the heat sink, and a core 1164 that extends along the axis A between the distal and proximal heat sink elements. In the illustrated embodiment, the proximal heat sink element 1162 is formed integrally with the core 1164 (FIG. 4) and the distal heat sink element 1160 is separately attached to the core by one or more threaded fasteners (not shown). In other embodiments, the heat sink can be formed from other arrangements of components or a unitary piece of material without departing from the scope of the invention. As will be explained in further detail below, the heat sink 1114 is shaped and arranged to support the LED strips 1112 on an exterior surface of the core 1164. The heat sink 1114 is generally configured to transfer heat generated by the LED strips 1112 by conduction outward through the core 1164 along the axis A toward the distal and proximal heat sink elements 1160, 1162. And as explained below, the curing device 1100 guides the cooling fluid along the flow paths over the heat sink elements 1160, 1162 to provide convective cooling. The heat sink 1114 and housing 1110 are, however, shaped and arranged to substantially prevent the cooling fluid from flowing through the interior of the heat sink or radially inward of the LED strips 1112.

As shown in FIG. 5, the heat sink 1114 defines a sealed central cavity 1170 extending along the axis A from the distal end portion to the proximal end portion. In the illustrated embodiment, the cavity 1170 is formed by passages 1170A, 1170B, 1170C extending axially through the distal element 1160, the proximal element 1162, and the core 1164, respectively. A heat sink connector 1172 configured for being operatively coupled with the housing connector 1132 is positioned in the passage 1170B formed in the proximal heat sink element 1162. In the illustrated embodiment, the heat sink connector 1172 is shaped and arranged to form a seal that sealingly engages the proximal heat sink element 1162 to seal the proximal end of the cavity 1170 to inhibit cooling fluid from flowing into the cavity. Similarly, a seal 1174 is received in the passage 1170A of the distal heat sink element 1160 to seal the distal end of the cavity 1170 and thereby inhibit cooling fluid from flowing into the cavity.

At least one signal carrier (e.g., an electrical or optical conductor), which is not illustrated in FIG. 5 for clarity, extends through the cavity 1170 for conveying signals from the heat sink connector 1172 to the LED strips 1112. In addition, a plurality of signal carriers extend from the heat sink connector 1172 through the cavity 1170 and the distal seal 1174 for being connected to the camera 1142 and the LED fixture 1144. Suitably, the distal seal 1174 sealingly engages these signal carriers to inhibit cooling fluid from flowing into cavity 1170 through the interfaces between the signal carriers and the seal. The heat sink connector 1172 connects the signal carriers in the cavity 1170 to the housing connector 1132, which in turn is connected to the signal carriers 1018 received in the flexible conduit 1016. Together, the signal carriers 1018 and the connectors 1172, 1132 connect the LED strips 1112, the camera 1142, and the LED fixture 1144 to the user interface 1012 at a remote location external to the cooling device 1100.

Referring to FIG. 4, the core 1164 of the heat sink 1114 has an exterior surface comprising a distal segment 1164A having a first generally polygonal cross-sectional shape and a proximal segment 1164B having a second generally polygonal cross-sectional shape of a different configuration. In one or more embodiments, the polygonal cross-sectional shapes of the exterior surfaces of the distal and proximal segments 1164A, 1164B of the core 1164 define a plurality of flats, each shaped and arranged for supporting one LED strip 1112 on each of the core segments. In the illustrated embodiment, the exterior surfaces of the distal and proximal segments 1164A, 1164B each have a cross-sectional shape of a generally symmetrical dodecagon of about the same size but a different angular orientation about the axis A. For example, the flats of the proximal segment 1164B is offset by about 30° about the axis A from the flats of the distal segment 1164A. The arrangement causes the LEDs on the LED strips 1112 not to be uniformly distributed over the outer surface of the core 1164. As explained below, the angularly offset flats of the distal and proximal segments 1164A, 1164B of the core 1164 mount the LED strips 1112 to emit electromagnetic radiation at different angular orientations to promote even transmission of electromagnetic radiation around the internal circumference of the liner L during use. Although the illustrated distal and proximal segments 1164A, 1164B have angularly offset flats, it will be understood that the core can have other shapes in other embodiments.

Figure 2:
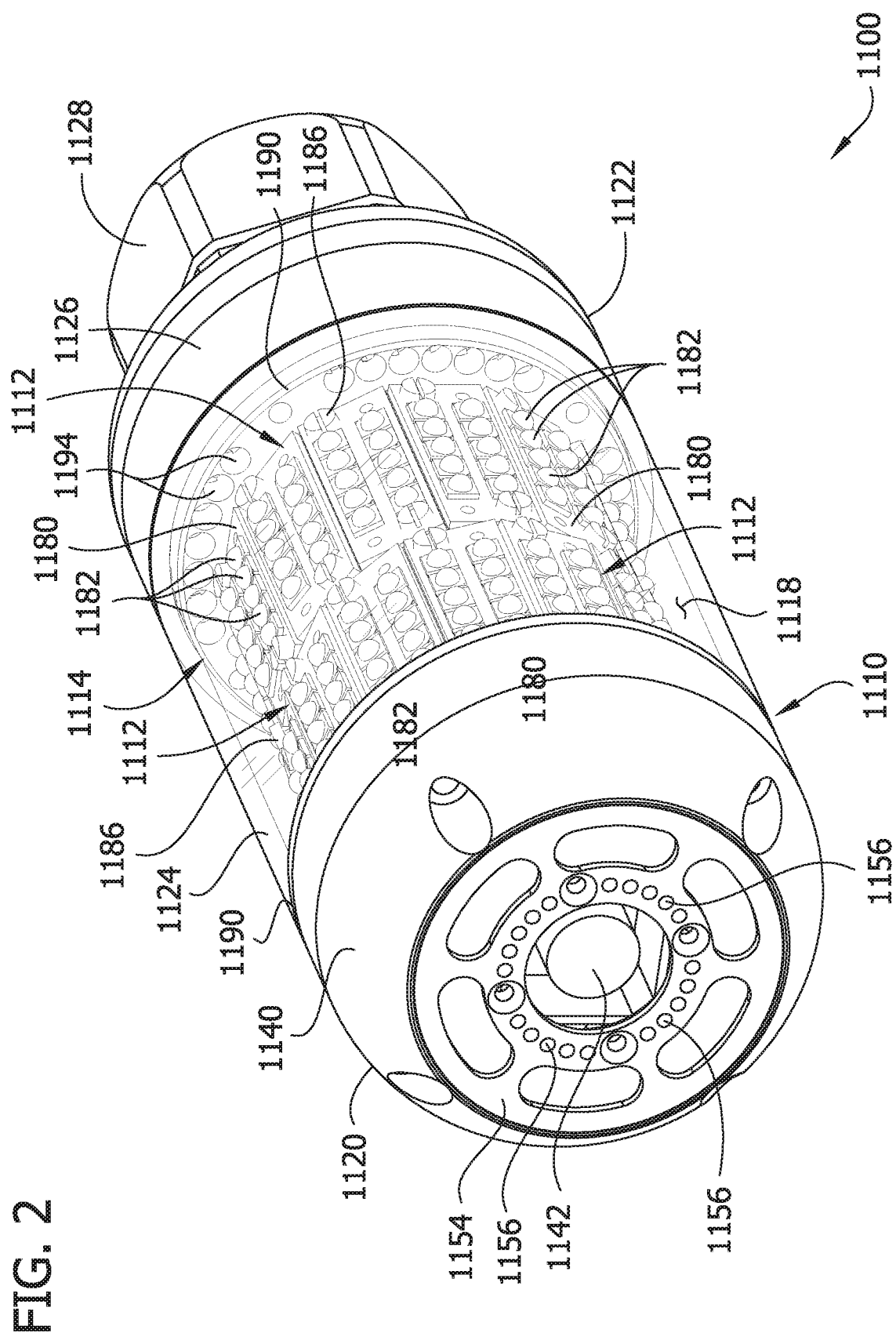
FIG. 2 is a perspective of a curing device of the liner curing system.
Figure 3:
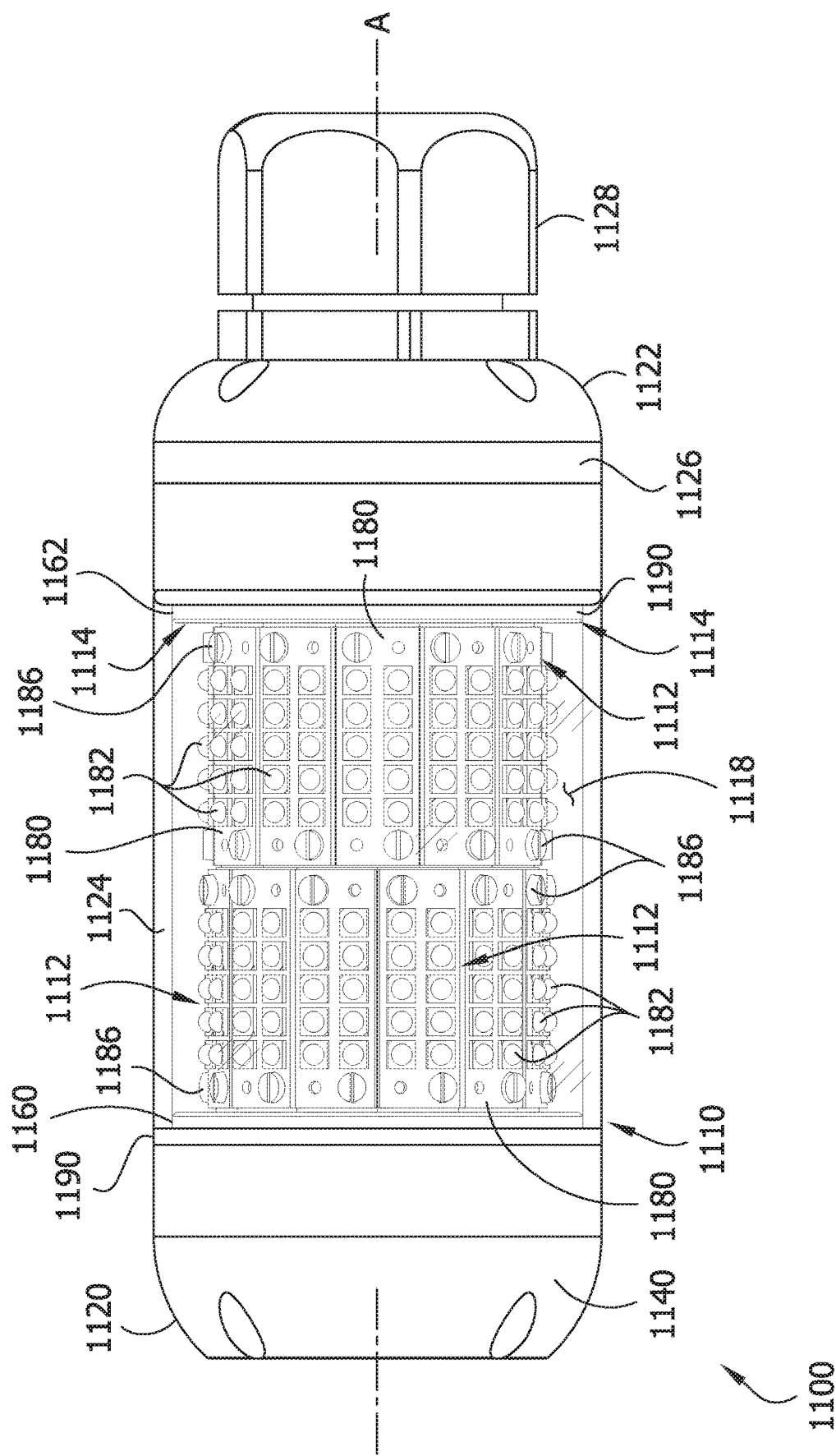
FIG. 3 is side elevation of the curing device.

In the illustrated embodiment, an LED strip 1112 is mounted on each flat of the polygonal exterior surface of each of the distal and proximal segments 1164A, 1164B of the core 1164. Thus, each of the distal and proximal segments 1164A, 1164B supports twelve LED strips 1112 at angularly spaced positions about the axis A. Because the polygonal sides of the distal and proximal segments 1164A, 1164B are angularly offset from one another, the LED strips supported on the distal and proximal segments emit electromagnetic radiation in different, preferably overlapping, orientations. As shown in FIGS. 2 and 3, each LED strip 1112 comprises a thermally conductive substrate (e.g., an aluminum substrate) for conveying heat generated by the LED strips 1112 to the core 1164 by conduction. A plurality of LEDs 1182 (e.g., ten LEDs) configured for emitting electromagnetic radiation suitable for curing the resin in the liner L are mounted on each substrate 1180 at spaced apart locations along the axis A. It is understood that an LED can emit electromagnetic radiation having a wavelength outside the visible spectrum. Screws 1186 extend through each substrate 1180 to mount the respective LED strip 1112 on the respective flat of the respective segment 1164A, 1164B of the core 1164. Thus, the LEDs 1182 are arranged to convey electromagnetic radiation radially outward from the core 1164 through the side wall 1124. In the illustrated embodiment, the LED strips 1112 are positioned in the flow path FP and the substrates 1180 of the LEDs cover substantially the entire exterior surface of the core 1164. Thus, the LED strips 1112 are arranged to substantially shield the core 1164 from direct exposure to cooling fluid flowing along the flow path FP (i.e., the core is substantially free of direct exposure to cooling fluid flowing along the flow path). But as explained below, the core 1164 is configured to convey heat by conduction to the proximal and distal heat sink elements 1160, 1162, which are directly exposed to the cooling fluid flowing along the flow path FP.

Figure 6A:
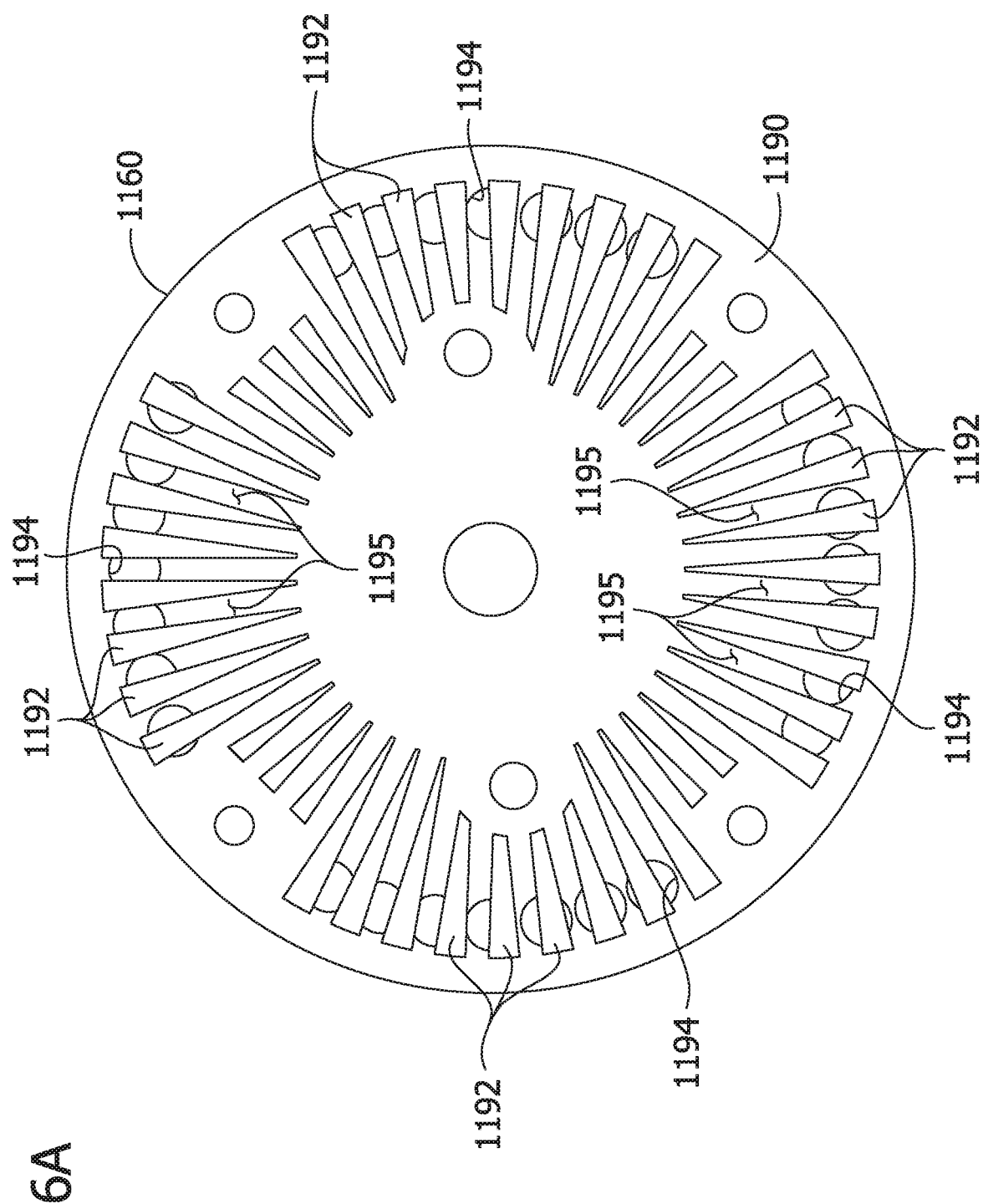
FIG. 6A is a distal end elevation of a distal heat sink element of the curing device.
Figure 6B:
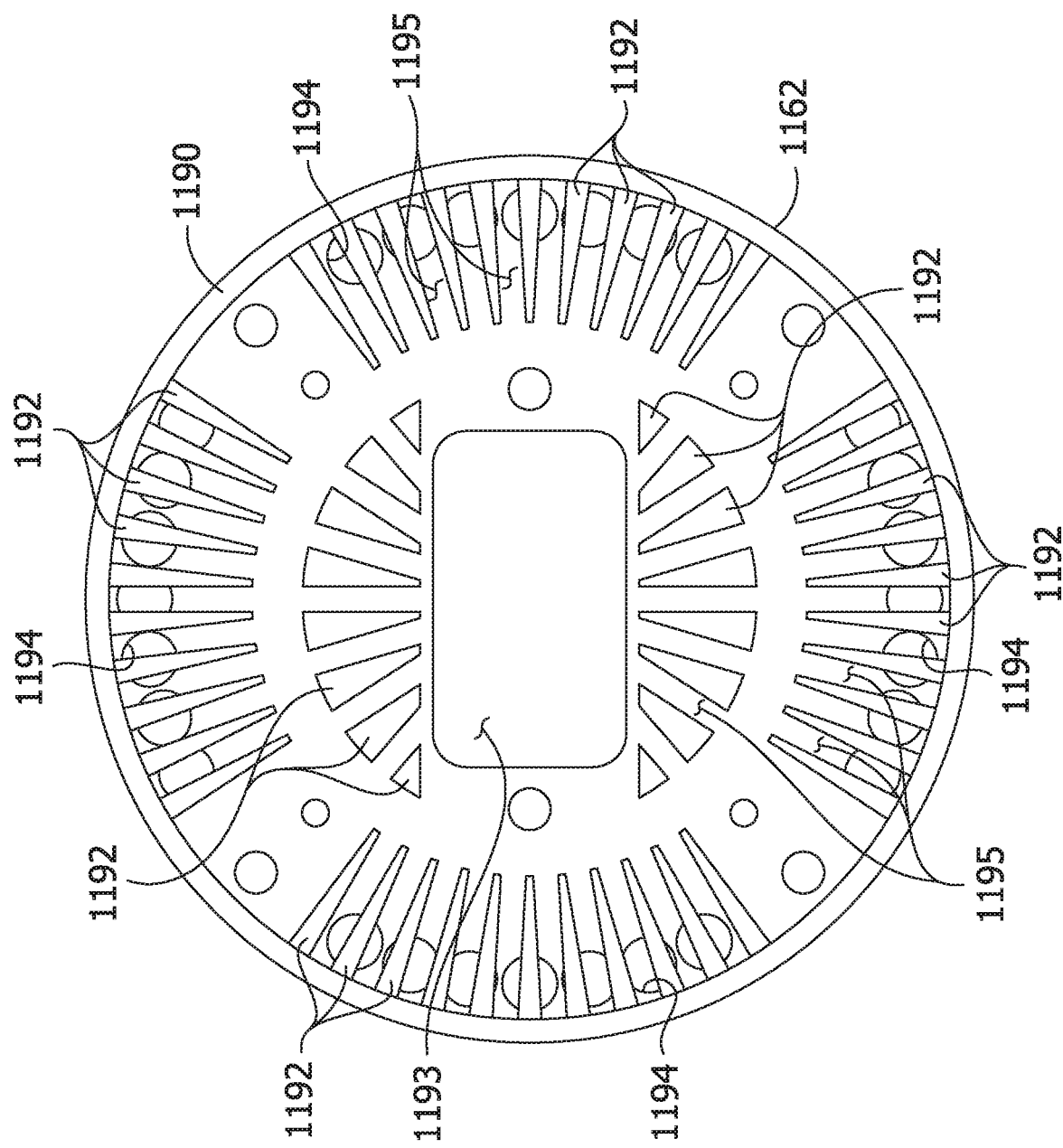
FIG. 6B is a proximal end elevation of a proximal heat sink element of the curing device.

Referring to FIGS. 3-5, in the illustrated embodiment the distal and proximal heat sink elements 1160, 1162 have substantially similar features arranged in mirror image. Each of the distal and proximal heat sink elements 1160, 1162 comprises an axially inboard wall 1190 that extends radially outward from a respective end of the core 1164. A plurality of spaced apart fins 1192 extend axially outboard from the respective wall 1190. As shown in FIGS. 6A and 6B, the fins 1192 of each heat sink element 1160, 1162 are spaced apart from one another to define gaps 1195 therebetween. In the illustrated embodiments, the fins 1192 extend radially as well as axially and are arranged at angularly spaced apart locations about the axis A. As shown in FIG. 6A, the distal heat sink element 1160 includes a single ring of angularly spaced apart fins 1192 located adjacent the outer perimeter of the respective wall 1190. As shown in FIG. 6B, the proximal heat sink element 1162 includes a plurality of inner fins 1192 that are arranged at spaced apart locations on opposite sides of an opening 1193 for receiving the housing connector 1132 therein. The proximal heat sink element 1162 also includes a plurality of outer fins 1192 spaced apart radially outward of the inner fins that are angularly spaced apart about the axis. Thus, both the distal and proximal heat sink elements 1160, 1162 comprise fins 1192 that are shaped and arranged to have axially and radially extending major surfaces that oppose the major surfaces of adjacent fin(s) to define gaps 1195 for channeling air flow (as explained below). Other embodiments can include other arrangements of fins without departing from the scope of the invention.

As shown in FIGS. 2, 4, 5, 6A, and 6B, walls 1190 of the heat sink elements 1190, 1192 each define a plurality of axial openings 1194 that communicate with at least some of the gaps 1195. The walls 1190 are shaped and arranged to contact the housing 1110 to substantially inhibit the cooling fluid from flowing past the distal and proximal heat sink elements 1160, 1162 radially outward of the walls. Thus, the distal and proximal heat sink elements 1160, 1162 are shaped and arranged to direct the cooling fluid along the flow path FP through the axial openings 1194 in the walls 1192. The heat sink elements 1160, 1162 thereby force the cooling fluid to flow along the major surfaces of the axially extending fins 1192 to promote heat transfer between the fins and the cooling fluid.

Referring to FIG. 5, the heat sink 1114 and the housing 1110 together define the cooling fluid flow path FP to include at least a segment that is located radially between the heat sink and the housing. After the cooling fluid enters the interior chamber 1118 of the housing 1110 through the inlet 1130, the cooling fluid flow path FP extends through the gaps 1195 between the axially extending fins 1192 of the proximal heat sink element 1162. Here the flow path FP is defined by the heat sink element 1162 and a portion of the proximal end cap 1126. The proximal heat sink element 1162 guides substantially all of the cooling fluid from the gaps 1195 between the fins 1192 through the openings 1194 formed in the wall 1190. The cooling fluid then flows along a segment of the flow path FP extending away from the proximal heat sink element 1162 in direction generally parallel to the axis A over the LED strips 1112. This segment of the flow path FP is defined by an annular gap between the core 1164 and the side wall 1124. Like the proximal heat sink element 1162, the distal heat sink element 1160 directs substantially all of the cooling fluid flowing along the flow path FP through the openings 1194 formed in the wall 1190. The flow path FP is defined by the heat sink element 1160 and a portion of the distal end cap 1140. The cooling fluid flows along the flow path FP from the openings 1194 through the gaps 1195 between the fins 1192 and out the cooling fluid outlet 1156.

Referring to FIG. 1, to cure a liner L positioned in a host pipe P, a technician connects the flexible conduit 1016 and signal carriers 1018 to the curing device 1100 and inserts the curing device through the manhole MH into the interior of the liner L. When the curing device 1100 is aligned with the uncured liner L, the technician activates the LED strips 1112 using the user interface 1012. Referring to FIG. 5, the LEDs 1182 emit electromagnetic radiation in a wavelength range configured for curing the resin impregnating the liner L. While the LED strips 1112 emit the electromagnetic radiation, the annular LED fixture 1144 illuminates the liner L and the camera 1142 transmits images of the illuminated portion of the interior of the liner L to the user interface 1012. The user interface 1012 displays the images on the display 1012C. Using the images on the display 1012C as a guide, the technician moves the curing device 1100 axially along the interior of the liner at a speed selected to achieve the desired level of curing of the liner L.

Throughout this process, the LED strips 1112 generate a substantial amount of heat. To remove the heat generated by the LED strips 1112, the technician directs air from the air compressor 1014 through the flexible conduit 1016 into the interior chamber 1118 of the curing device 1100. During the curing process, the cooling fluid continuously flows into the housing 1110 through the cooling fluid inlet 1130, then along the flow path FP through the interior chamber 1118, and finally out of the curing device 1100 through the cooling fluid outlet 1156. The LED strips 1012 transfer heat to the core 1164 of the heat sink 1114 by conduction, and the core 1164 conducts heat axially away from the LED strips toward the distal and proximal heat sink elements 1160, 1162. The distal and proximal heat sink elements 1160, 1162 transfer heat to the air flowing along the flow path FP by convection. In particular, the fins 1192 transfer much of the heat to the air as it flows along their major surfaces through the gaps 1195. In addition, where the flow path FP passes over the LEDs in the annular space between the core 1164 and the side wall 1124, heat is removed directly from the LEDs to the cooling air. The heat is expelled from the cooling device 1100 when the air is discharged from the interior chamber 1118 through the cooling fluid outlet 1156.

Figure 7:
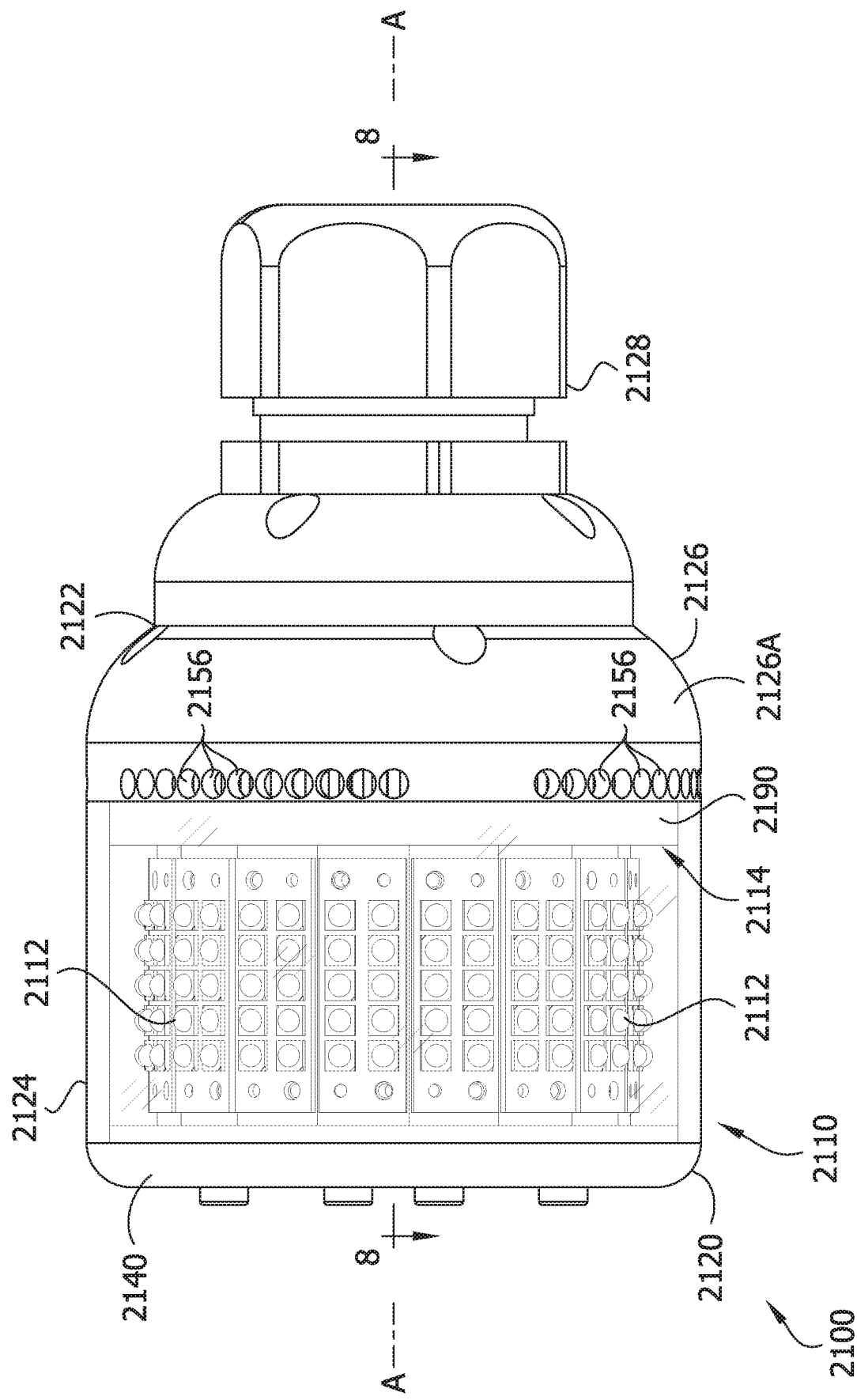
FIG. 7 is a top plan view of another embodiment of a curing device.
Figure 8:
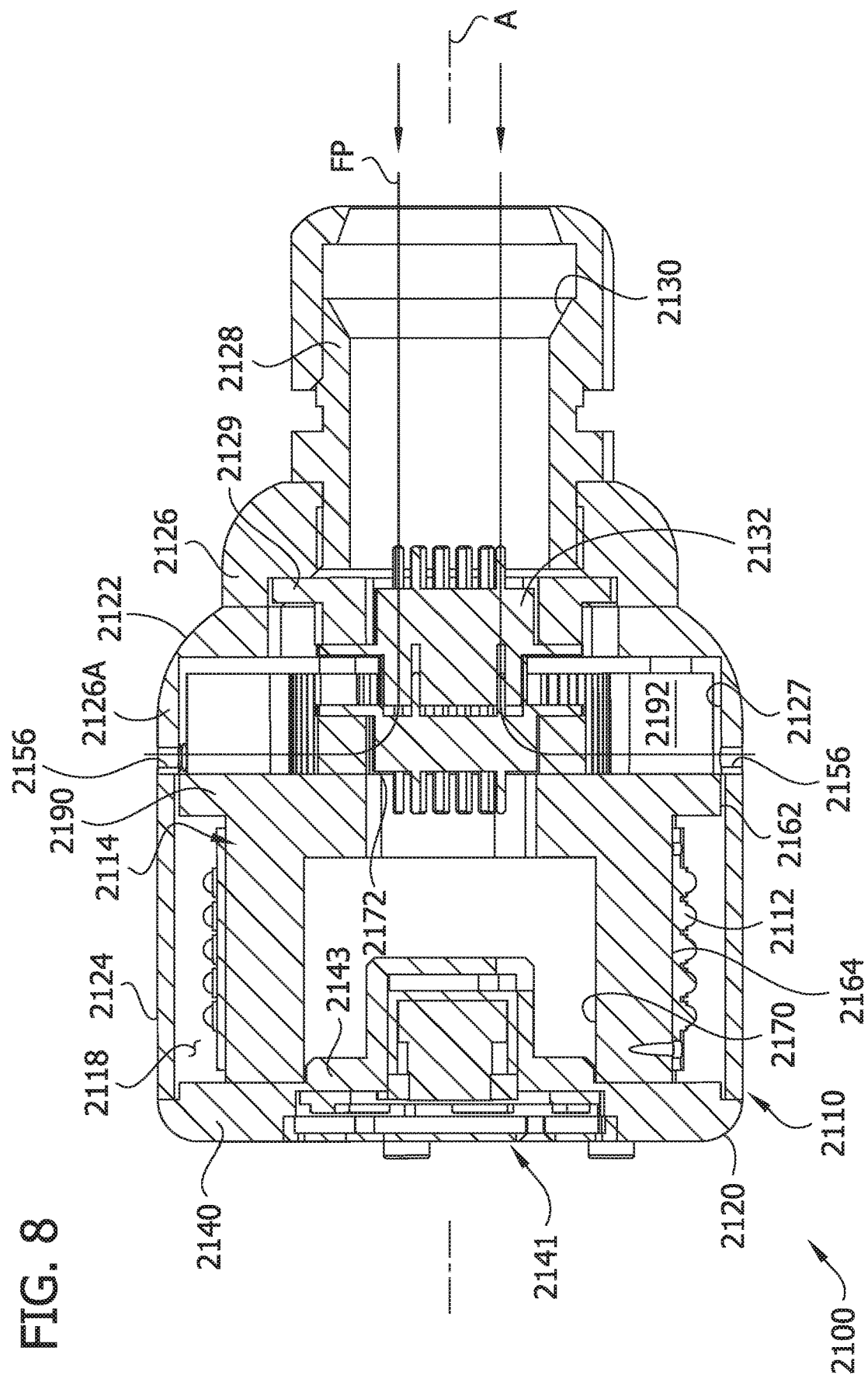
FIG. 8 is a section taken in the plane of line 8-8 of FIG. 7.
Figure 9:
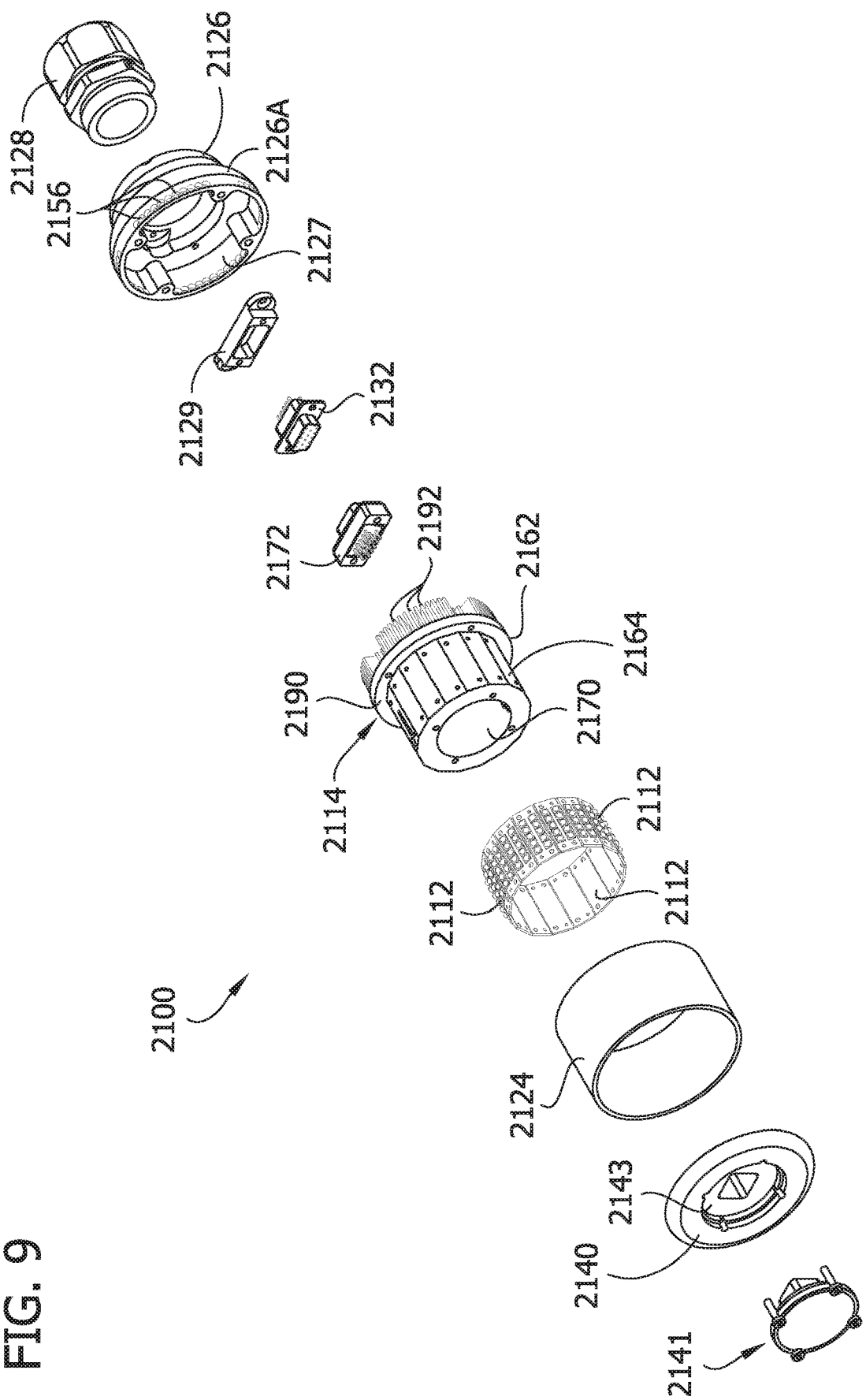
FIG. 9 is an exploded perspective of the curing device of FIG. 7.

Referring to FIGS. 7-9, another embodiment of a curing device is generally indicated at reference number 2100. The curing device 2100 is similar in many respects to the curing device 1100, and corresponding parts are given corresponding reference numbers, plus 1,000. Like the curing device 1100, the curing device 2100 can be used in the system 1010 for curing a resin-impregnated pipe liner L. The curing device 2100 includes a housing, generally indicated at 2110 that supports a plurality of LED strips 2112. The LED strips 2112 are mounted on a heat sink, generally indicated at 2114, in thermal communication with the heat sink. As described below, the illustrated curing device 2100 is configured to remove the heat generated by the LED strips 2112 by transferring the heat through the heat sink 2114 to air provided by the air compressor 1014 that flows along a flow path FP inside only a proximal portion of housing 2110.

The housing 2110 includes a distal end assembly 2120, a proximal end assembly 2122 spaced apart from the distal end assembly along an axis A, and a transparent side wall 2124 extending along the axis from the distal end assembly to the proximal end assembly to define an interior chamber 2118. As above, the housing 2110 is configured to channel the air or other cooling fluid along the fluid flow path FP from at least one cooling fluid inlet 2130 to at least one cooling fluid outlet 2156 and substantially seal the fluid flow path against the passage of fluids except through the cooling fluid inlet or the cooling fluid outlet. Unlike the curing device 1100, however, the proximal end assembly 2122 of the curing device 2100 defines both the cooling fluid inlet 2130 and a cooling fluid outlet 2156, The distal end assembly 2120 comprises a distal end cap 2140 and an image capture system 2141 that is supported by the distal end cap. The image capture system 2141 can include any of the features of the image capture system of the curing device 1100 described above. It will also be understood that the distal end assembly could include other sensors or be free of sensors without departing from the scope of the invention. Unlike the distal end assembly 1120 of the curing device 1100, the distal end assembly 2120 does not define the cooling fluid outlet.

The proximal end assembly 2122 includes a proximal end cap 2126 and a conduit fitting 2128 mounted on the proximal end cap. The conduit fitting 2128 is configured to fluidly couple the curing device 2100 to the distal end portion of the cooling fluid conduit 1016 (FIG. 1). As shown in FIG. 8, the conduit fitting 2128 also defines the cooling fluid inlet 2130 of the housing 2110. A connector mount 2129 is mounted on the proximal end cap and configured to support a housing connector 2132 for connecting the curing device 2100 to signal carriers 1018 extending through the cooling fluid conduit 1016 (FIG. 1). Suitably, the connector mount 2129 is shaped and arranged so that fluid can flow past the connector mount along the flow path FP. The proximal end cap 2126 has a distal annular end portion 2126A that defines a cylindrical recess 2127 shaped and arranged for receiving a portion of the heat sink 2114 (described below). The distal end portion 2126A of the proximal end cap also defines a plurality of radially extending holes 2156 that form the cooling fluid outlet 2156 of the curing device 2100.

The heat sink 2114 comprises a proximal heat sink element 2162 that forms a proximal end portion of the heat sink and a core 2164 that extends distally along the axis A from the proximal heat sink element toward the distal end cap 2140. Unlike the heat sink 1114 of the curing device 1100, the heat sink 2214 does not include a distal heat sink element located distal to the core (e.g., no portion of the heat sink separate from the distal end cap 2140 extends radially outward of the LED strips 2112 at a location distal to the LED strips). As above, the heat sink 2114 defines a central longitudinal cavity 2170 and a heat sink connector 2172 is sealingly received in the proximal end portion of the cavity for connecting the housing connector 2132 to signal carriers (not shown) that extend from the heat sink connector through the cavity to the LED strips 2112 and the image capture system 2141. Thus, the curing device 2100 is shaped and arranged to substantially prevent cooling fluid from flowing through the cavity 2170.

Though the illustrated heat sink 2114 is free of a distal heat sink element separate from the distal end cap 2140, the distal end of the core 2164 can be thermally coupled to the distal end cap 2140 so that some of the heat generated by the LED strips 2112 is transferred by conduction to the distal end cap (which is directly exposed to the exterior of the curing device 2100). In the illustrated embodiment, the distal end portion of the core 2164 is in direct physical contact with the distal end cap 2140. Specifically, an inward facing surface of the core 2164 engages an outward facing surface of a proximal projection 2143 of the distal end cap 2140 and a distal facing surface of the core engages a proximal facing surface of the end cap. In other embodiments, the core of the heat sink could be thermally coupled to the distal end cap in other ways or the heat sink could be thermally isolated from the distal end cap without departing from the scope of the invention.

As above, the heat sink 2114 is shaped and arranged to support the LED strips 2112 on an exterior surface of the core 2164 (e.g., the core has a polygonal cross-sectional shape defining flats configured to support respective LED strips 2112 as described above). The heat sink 2114 is generally configured to conduct heat generated by the LED strips 2112 through the core 2164 along the axis A toward at least the proximal heat sink element 2162, and in some embodiments, also toward the thermally coupled distal end cap 2140.

Figure 10:
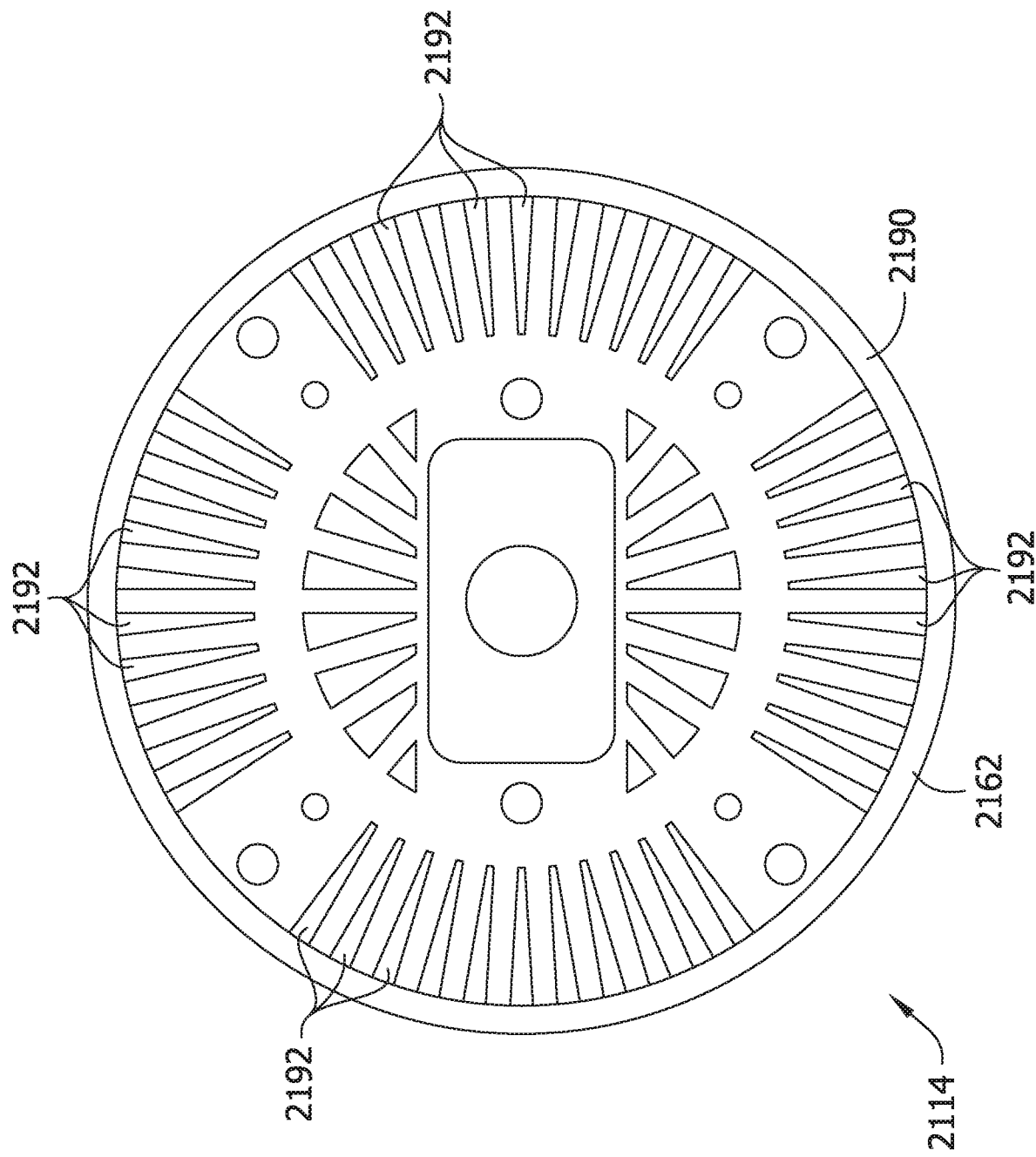
FIG. 10 is a proximal end elevation of a proximal heat sink element of the curing device of FIG. 7.
Figure 11:
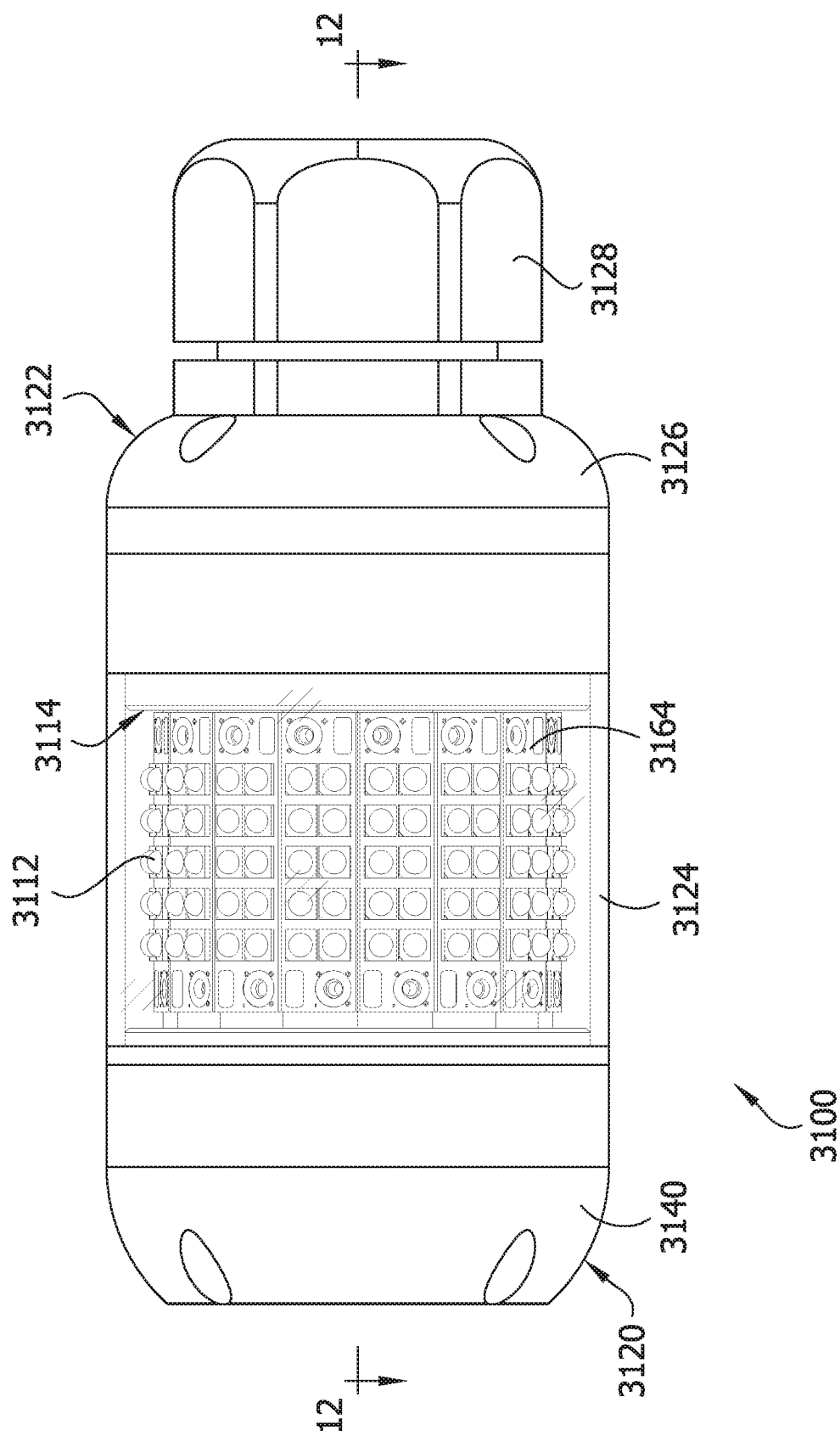
FIG. 11 is a top plan view of another embodiment of a curing device.

Like the proximal heat sink element 1162 of the curing device 1100, the proximal heat sink element 2162 comprises a wall 2190 that extends radially outward from a respective end of the core 2164 and engages the housing 2110 at a sealed interface that extends around the axis A to substantially prevent cooling fluid from flowing through the sealed interface. A plurality of spaced apart fins 2192 extend proximally along the axis A from the respective wall 2190. Referring to FIG. 10, the fins 2192 are shaped and arranged to define radially extending gaps 2195 that are open at the radially outer ends thereof. The fins 2192 are arranged in a radially inner set and a radially outer set. Unlike the wall 1190 of the proximal heat sink element 1162 of the curing device 1100, the wall 2190 of the proximal heat sink element 2162 is substantially solid and thus prevents cooling fluid in the gaps 2195 from flowing in a distal direction. Accordingly, the curing device 2100 is configured to substantially prevent cooling fluid from flowing into portions of the interior chamber 2218 located distal to the proximal heat sink element 2162 (e.g., locations that are aligned along the axis A with the LED strips 2112). Instead, the curing device 2100 is shaped and arranged so that fluid flows into the cooling device through the cooling fluid inlet 2130, along the flow path FP through the gaps 2195, and out the cooling fluid outlet openings 2156.

In use, the core 2164 of the heat sink 2114 conducts some of the heat generated by the LED strips 2112 distally to the distal end cap 2140, which transfers heat to the external environment. In addition, the core 2164 conducts heat generated by the LED strips 2112 proximally to the proximal heat sink element 2162. Simultaneously, cooling fluid flows into the curing device 2110 through the curing fluid inlet 2130 and along the cooling fluid flow path FP. The cooling fluid flows radially outward through the gaps 2195 between the fins 2192 along the major surfaces thereof, and the fins transfer heat to the cooling fluid flowing in the gaps by convection. After flowing radially outward from the gaps 2195, the heated cooling fluid then flows through the cooling fluid outlet holes 2156 in the proximal end cap 2126 and out of the curing device 2100.

Referring to FIGS. 11-15, another embodiment of a curing device is generally indicated at reference number 3100. The curing device 3100 is similar in many respects to the curing device 1100, and corresponding parts are given corresponding reference numbers, plus 2,000. Like the curing device 1100, the curing device 3100 can be used in the system 1010 for curing a resin-impregnated pipe liner L. The curing device 3100 includes a housing, generally indicated at 3110 that encloses a plurality of LED strips 3112. The LED strips 3112 are mounted on a heat sink, generally indicated at 3114, in thermal communication with the heat sink. As described below, the illustrated curing device 3100 is configured to remove the heat generated by the LED strips 3112 by transferring the heat through the heat sink 3114 to air provided by the air compressor 1014 that flows along a flow path FP that includes segments located radially inward of the LED strips.

The housing 3110 includes a distal end assembly 3120, a proximal end assembly 3122 spaced apart from the distal end assembly along an axis A, and a transparent side wall 3124 extending along the axis from the distal end assembly to the proximal end assembly to define an interior chamber 3118. As above, the housing 3110 is configured to channel the air or other cooling fluid along the fluid flow path FP from at least one cooling fluid inlet 3130 to at least one cooling fluid outlet 3156 and substantially seal the fluid flow path against the passage of fluids except through the cooling fluid inlet or the cooling fluid outlet.

Figure 12:
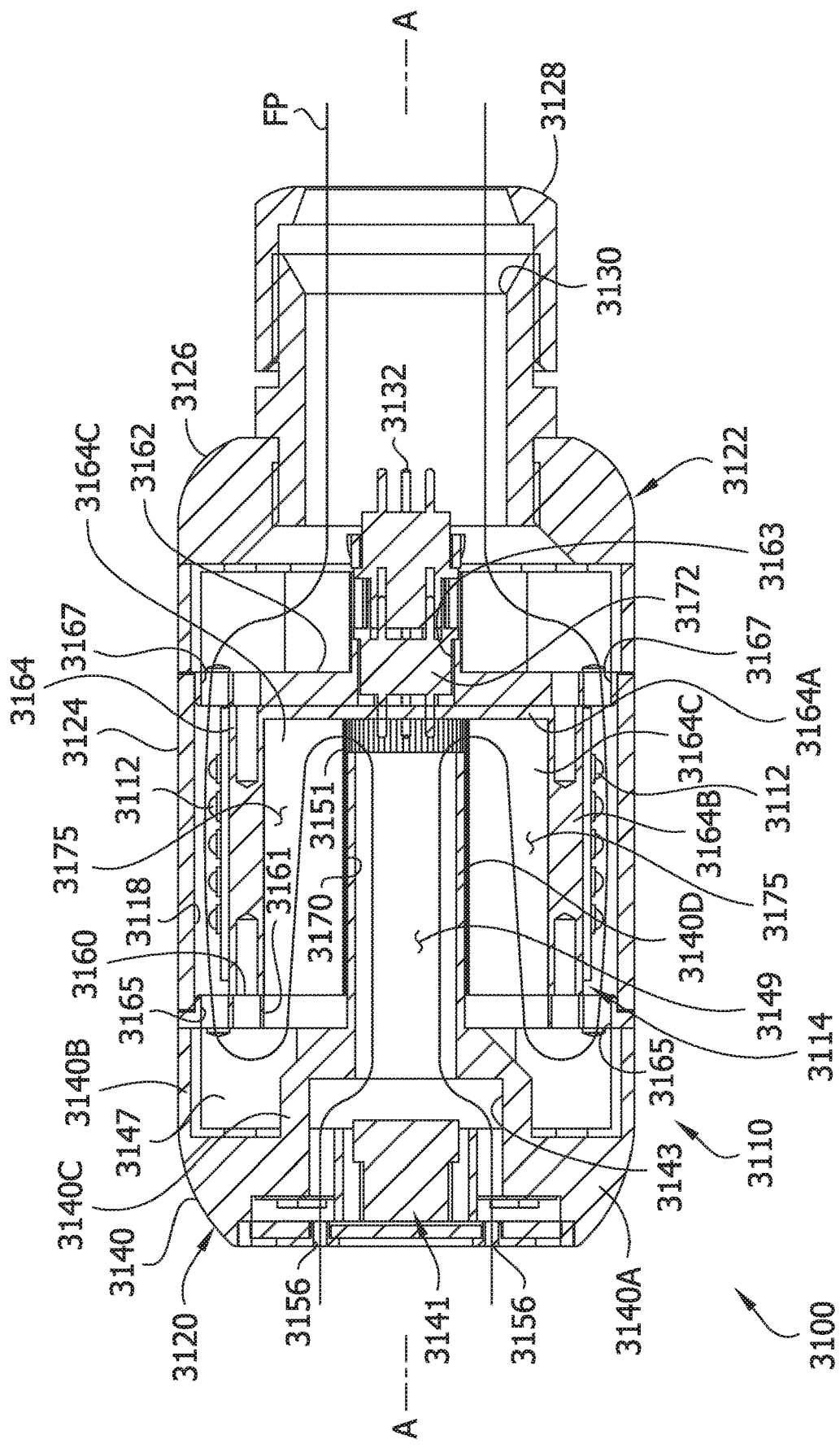
FIG. 12 is a section taken in the plane of line 12-12 of FIG. 11.
Figure 13:
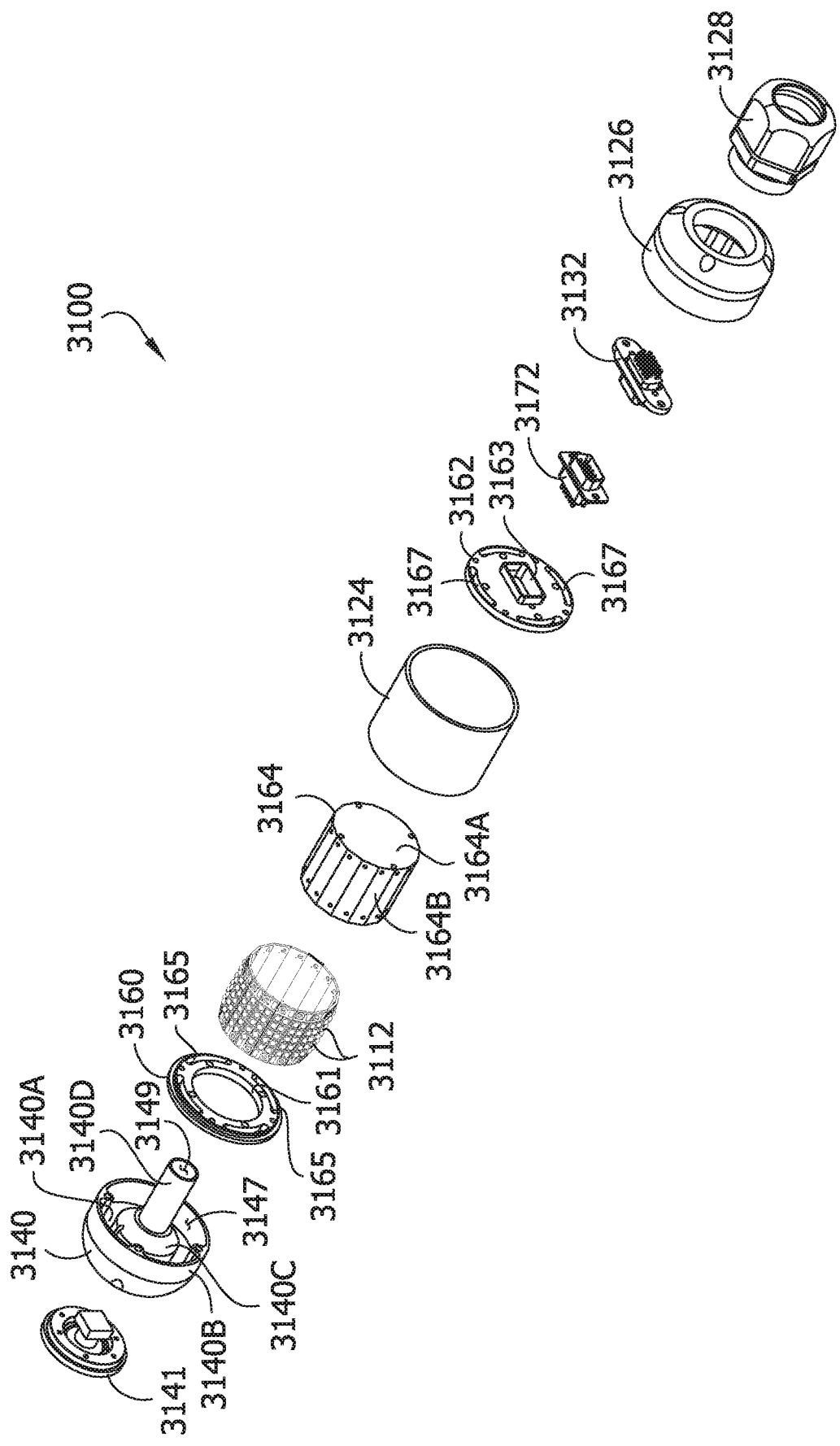
FIG. 13 is an exploded perspective of the curing device of FIG. 11 from a proximal vantage point.
Figure 14:
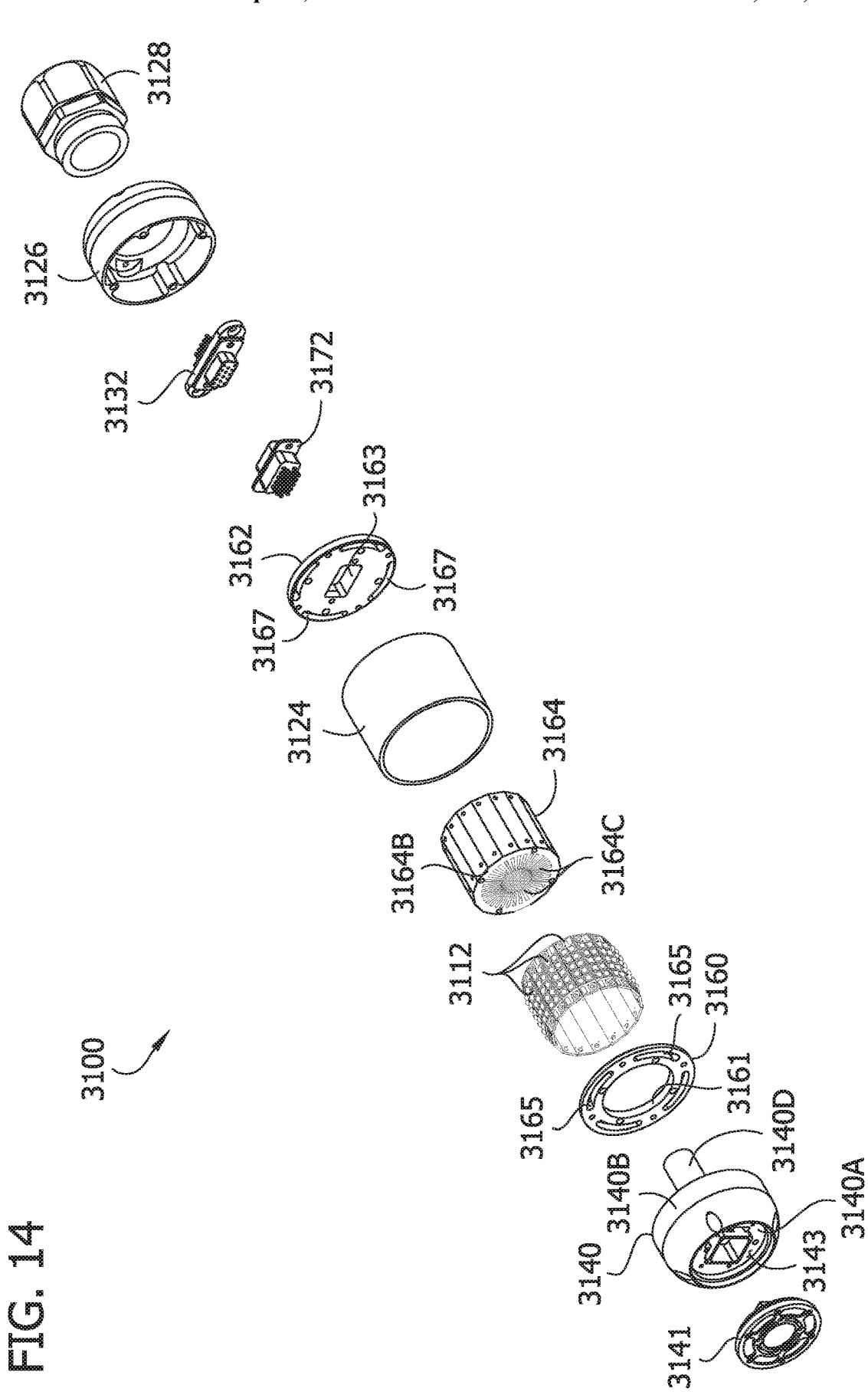
FIG. 14 is an exploded perspective of the curing device of FIG. 11 from a distal vantage point.
Figure 15:
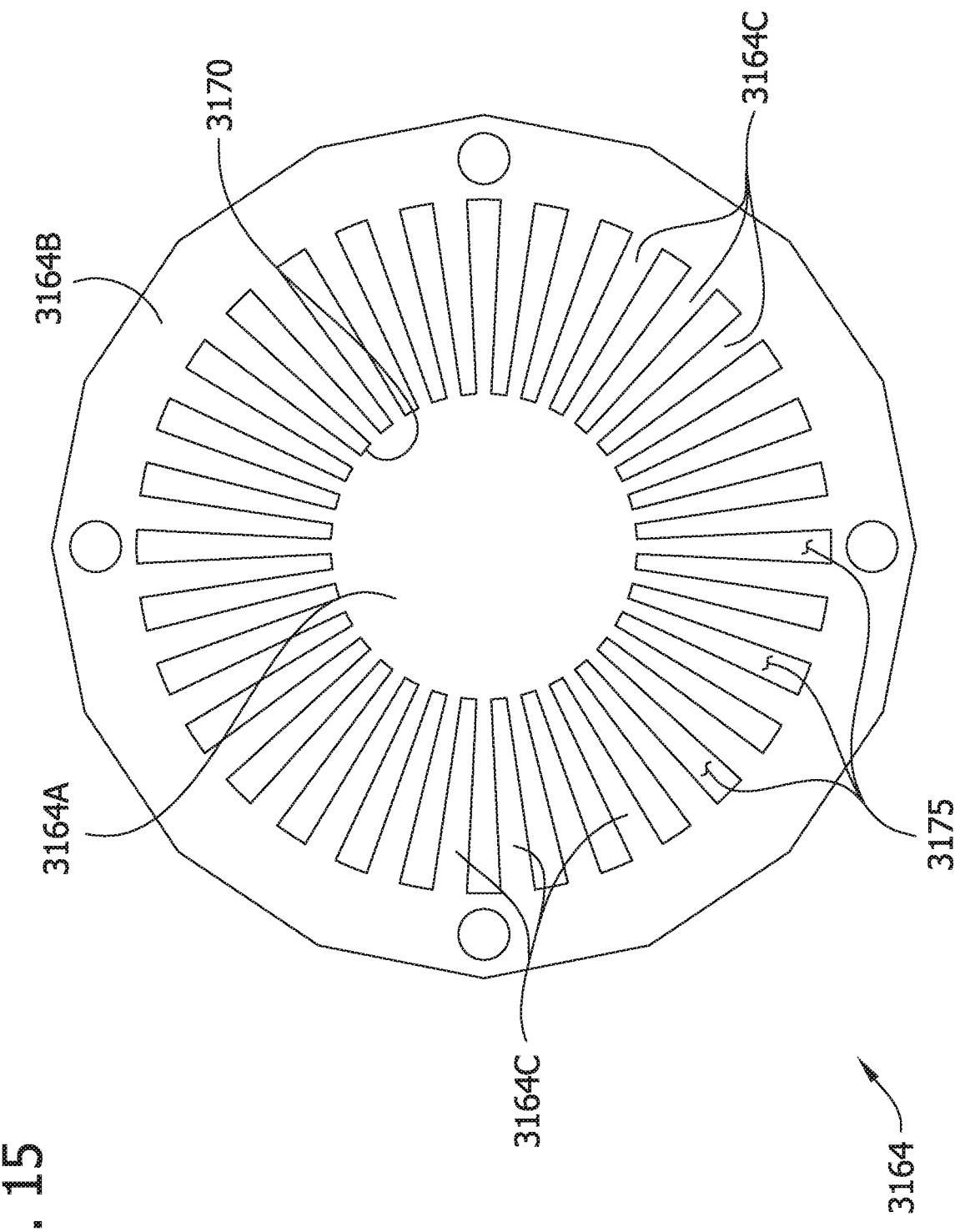
FIG. 15 is a distal end elevation of a heat sink core of the curing device of FIG. 11.
Figure 16:
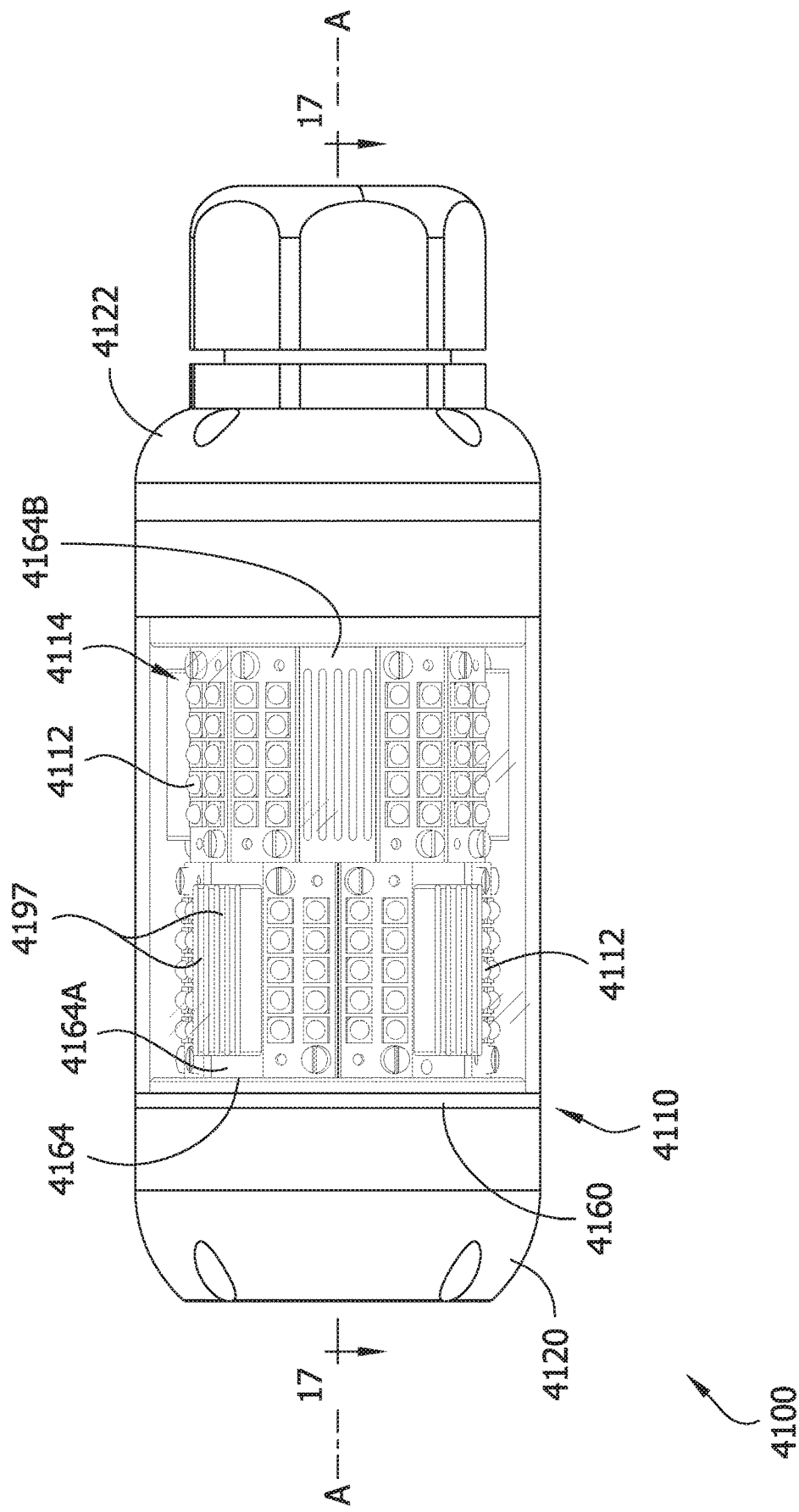
FIG. 16 is a top plan view of another embodiment of a curing device.
Figure 17:
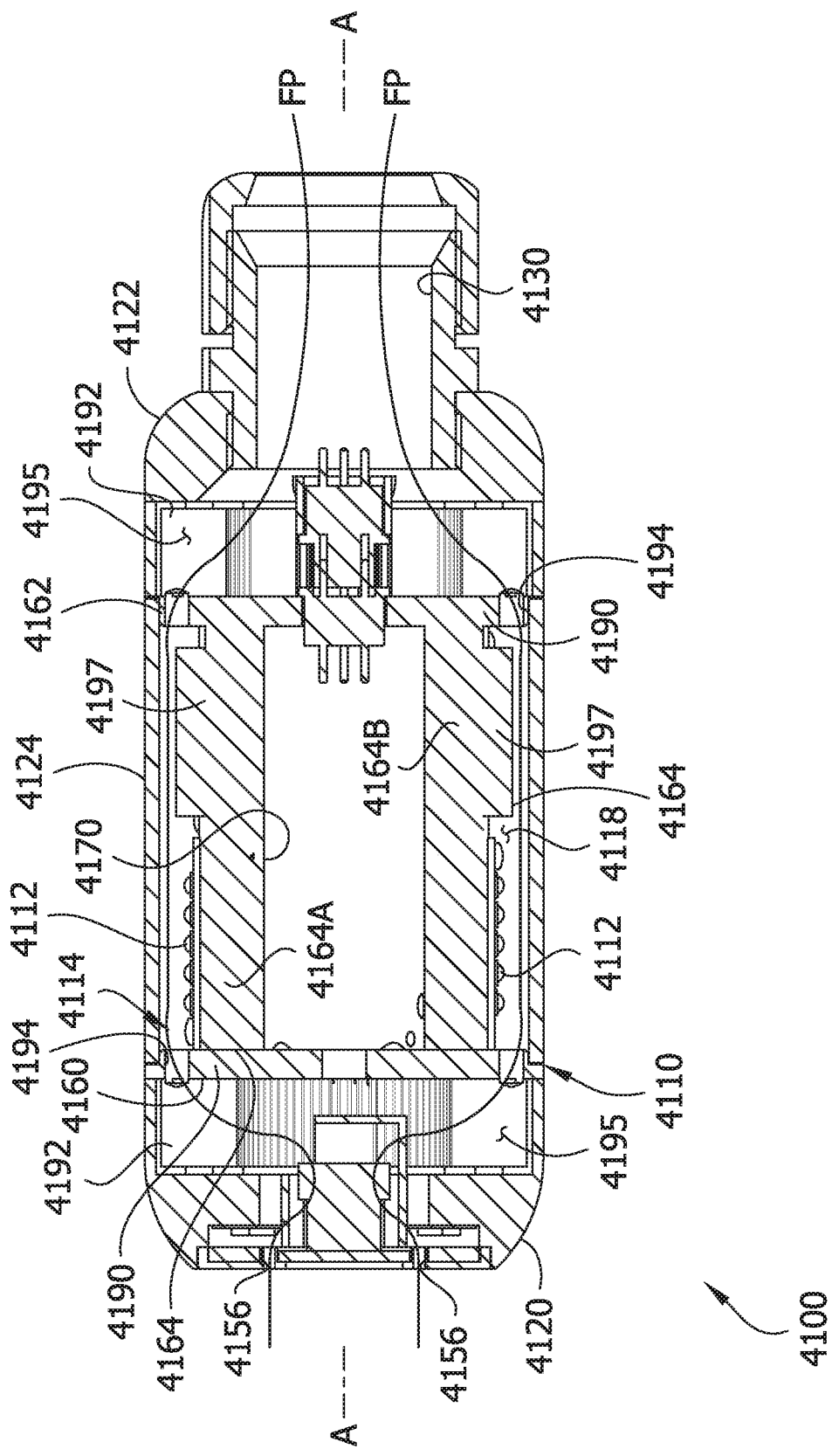
FIG. 17 is a section taken in the plane of line 17-17 of FIG. 16.
Figure 18:
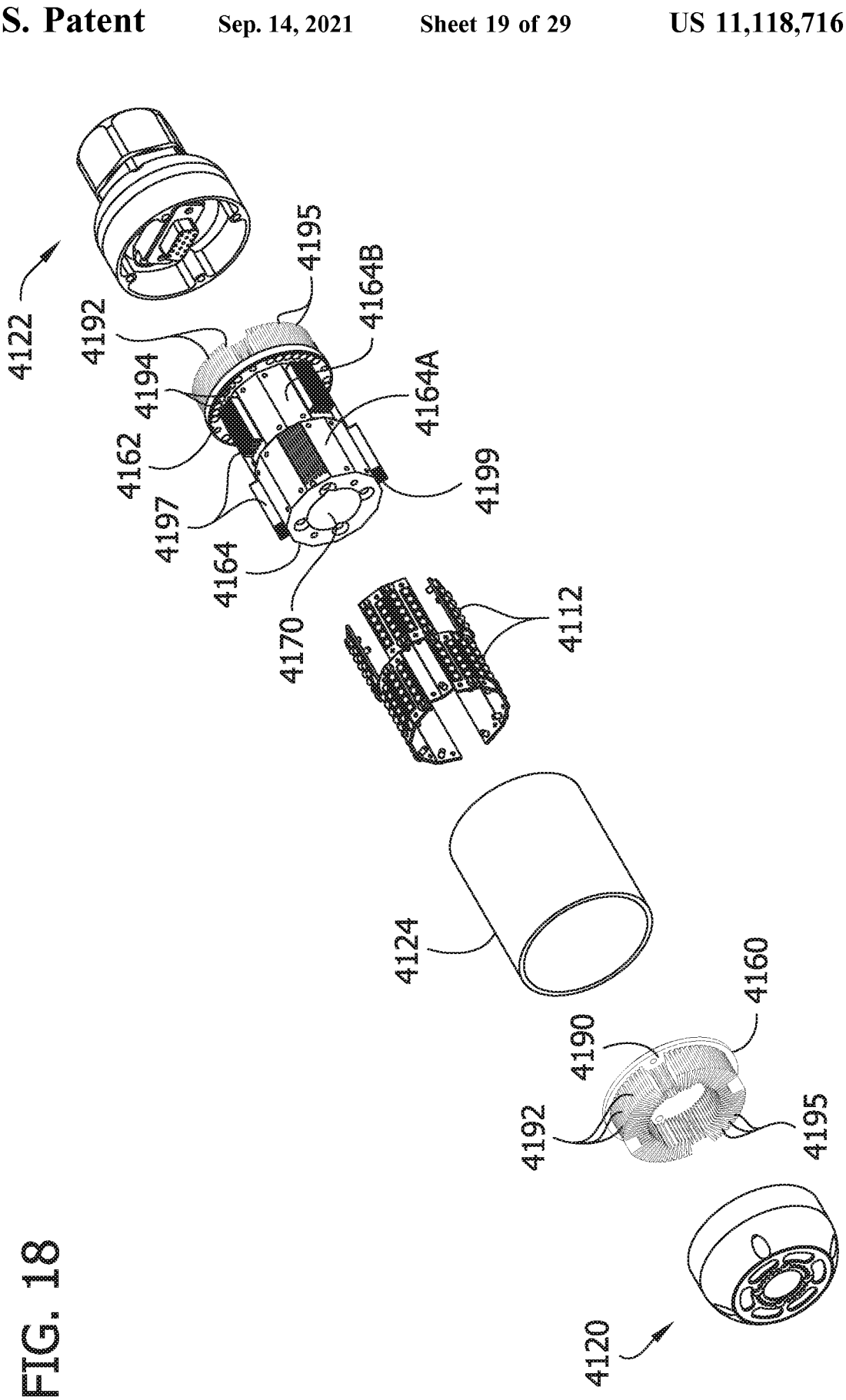
FIG. 18 is an exploded perspective of the curing device of FIG. 16.
Figure 19:
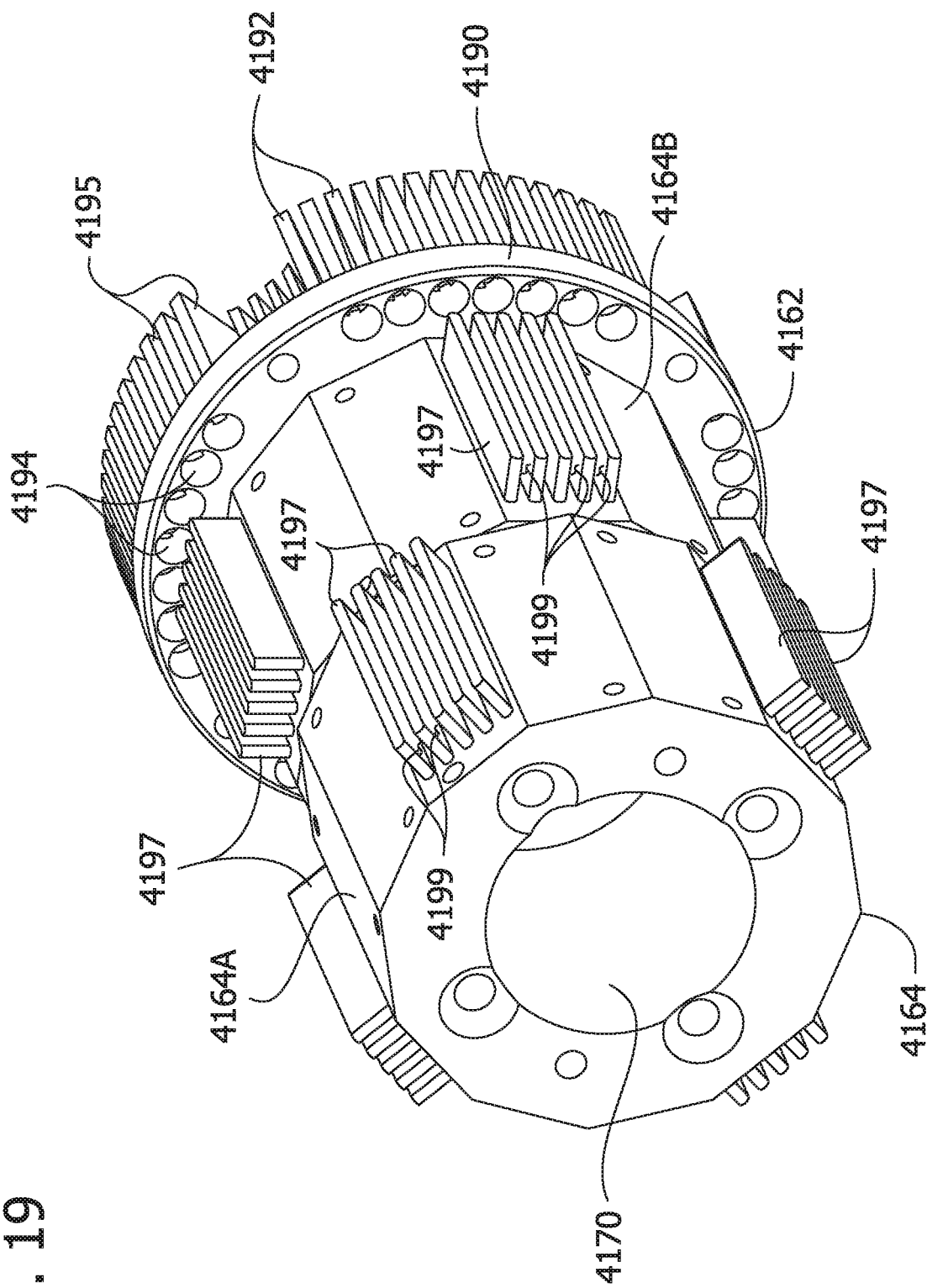
FIG. 19 is a perspective of a heat sink core of the curing device of FIG. 16.
Figure 21:
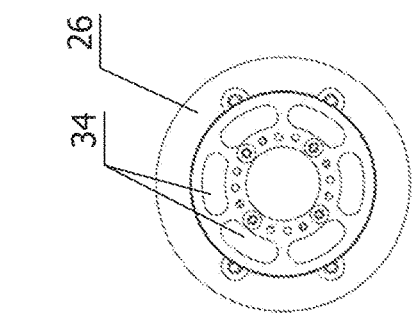
FIG. 21 is a distal end elevation of the curing device of FIG. 20.
Figure 20:
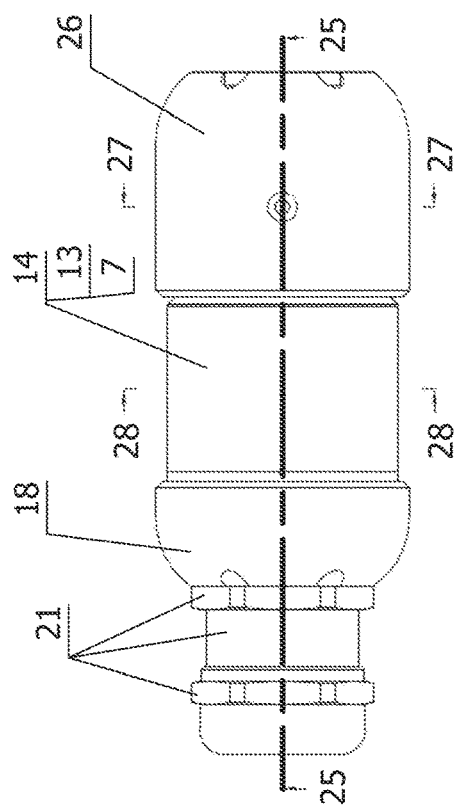
FIG. 20 is a top plan view of another embodiment of a curing device.
Figure 22:
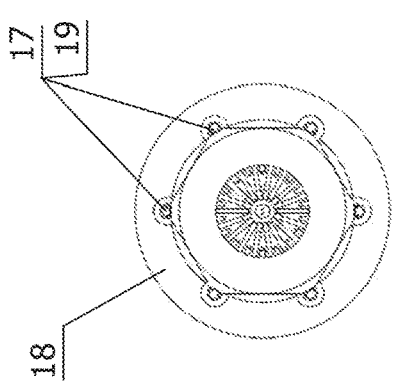
FIG. 22 is a proximal end elevation of the curing device of FIG. 20.
Figure 23:
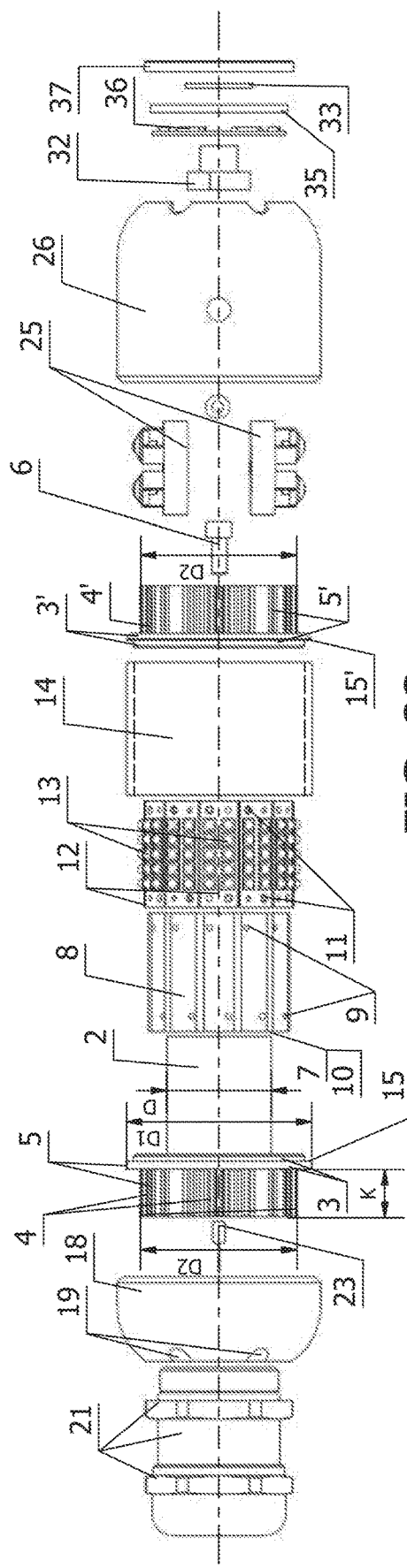
FIG. 23 is an exploded top plan view of the curing device of FIG. 20.
Figure 24:
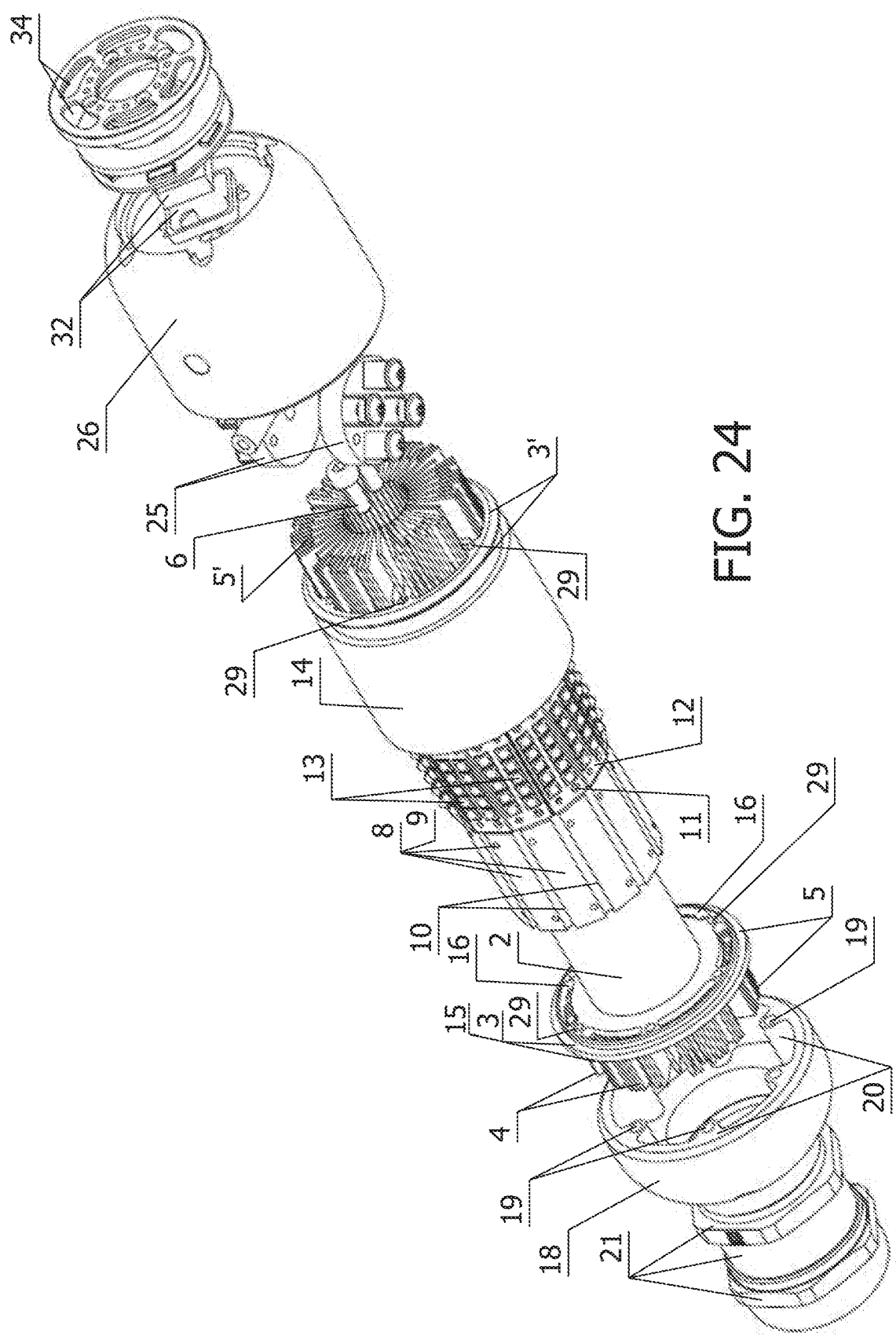
FIG. 24 is an exploded perspective of the curing device of FIG. 20.
Figure 25:
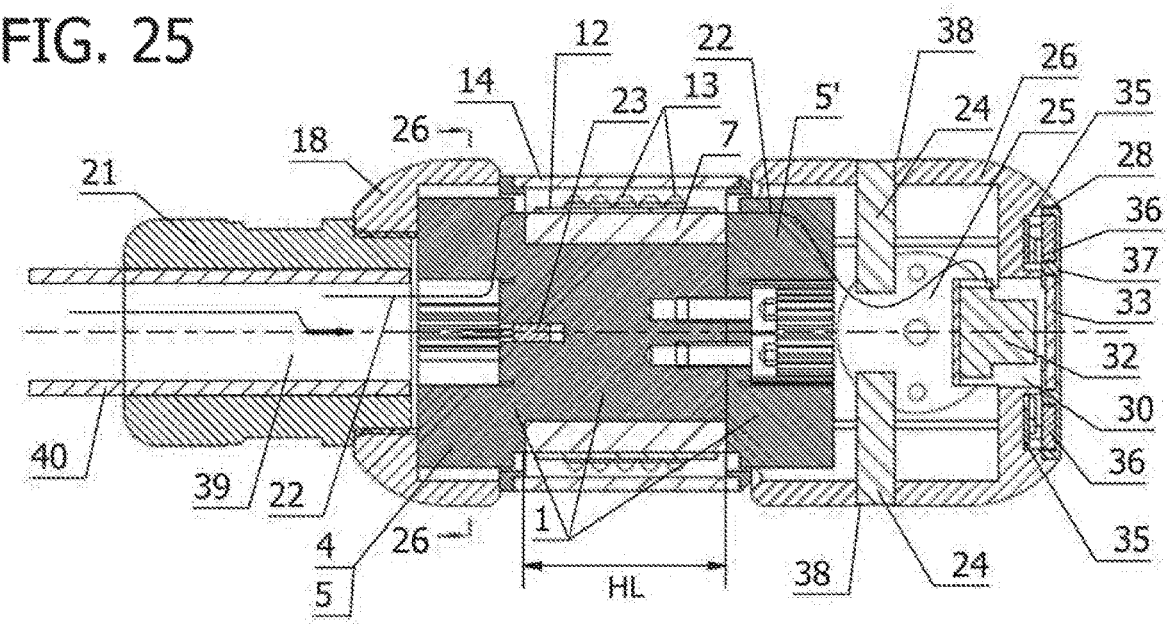
FIG. 25 is a section taken in the plane of line 25-25 of FIG. 20.
Figure 26:
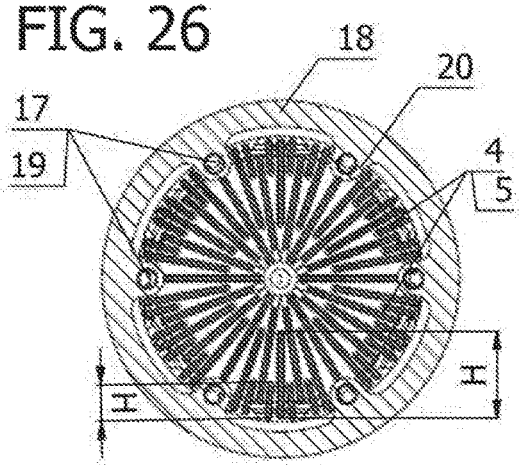
FIG. 26 is a section taken in the plane of line 26-26 of FIG. 25.

The proximal end assembly 3122 includes a proximal end cap 3126 and a conduit fitting 3128 mounted on the proximal end cap. The conduit fitting 3128 is configured to fluidly couple the curing device 3100 to the distal end portion of the cooling fluid conduit 1016 (FIG. 1). As shown in FIG. 12, the conduit fitting 3128 also defines the cooling fluid inlet 3130 of the housing 3110. A housing connector 3132 is supported in the interior of the proximal end assembly 3122 such that cooling fluid can flow past the housing connector along segments of the flow path FP extending through one or more passages between the housing connector and the proximal end assembly.

The distal end assembly 3120 comprises a distal end cap 3140 and an image capture system 3141 that is supported by the distal end cap. The image capture system 3141 can include any of the features of the image capture system of the curing device 1100 described above. It will also be understood that the distal end assembly could include other sensors or be free of sensors without departing from the scope of the invention. Like the distal end assembly 1120 of the curing device 1100, the distal end assembly 3120 defines at least one cooling fluid outlet opening 3156 at the distal end thereof.

In the illustrated embodiment, the distal end cap 3140 comprises a distal end wall 3140A and an annular outer skirt 3140B extending proximally from an outer edge portion of the distal end wall. The distal end cap 3140 also includes an inner annular hub 3140C extending proximally from a central region of the distal end wall 3140. An interior surface of the hub 3140C defines a distally facing recess 3143 in fluid communication with the cooling fluid outlet 3156. An outer surface of the hub 3140C is spaced apart from an inner surface of the outer skirt 3140B such that the surfaces define an annular recess 3147 therebetween. The distal end cap 3140 further includes a tube 3140D that extends proximally along the axis A from the hub 3140C to a proximal end that is spaced apart from a proximal end portion of the heat sink 3114 to define a gap 3151 as described below. The inner surface of tube 3140D defines a channel 3149 providing fluid communication between the recess 3143 in the hub 3140C and the gap 3151.

The heat sink 3114 comprises a distal heat sink support member 3160, a proximal heat sink support member 3162, and a core 3160 extending along the axis between the distal and proximal heat sink support members. In the illustrated embodiment, each of the heat sink support members 3160, 3162 is generally disc-shaped and has a radially outer end that is sealingly engaged with the housing 3110 to prevent cooling fluid from flowing through interfaces between the support members and the housing. The distal heat sink support member 3160 defines a large central opening 3161 through which the tube 3140D of the distal end cap 3140 extends with substantial clearance. The proximal support member 3162 also defines a central opening 3163 that is shaped and arranged for sealingly receiving a heat sink connector 3172 therein. Each of the heat sink support members 3160, 3162 also defines at least one outer flow opening 3165, 3167 at a position located radially between the heat sink core 3164 and the housing side wall 3124 (e.g., a position that is radially aligned with the LED strips 3112). As explained below, the curing device 3100 is configured to guide the cooling fluid along the flow path FP through the proximal flow openings 3167 in the proximal support member 3162, then through an annular gap between the heat sink core 3164 and the housing side wall 3124, then through the flow openings 3165 formed in the distal support member 3160 into the annular recess 3147, and then through the central opening 3161 of the distal support member along the exterior of the tube 3140D.

As above, the heat sink 3114 is shaped and arranged to support the LED strips 3112 on an exterior surface of the core 3164 (e.g., the core 3164 has a polygonal cross-sectional shape defining flats configured to support respective LED strips 3112 as described above). The core 3164 is formed from thermally conductive material and is thermally coupled to the LED strips 3112 to conduct heat away from the LED strips. In the illustrated embodiment, each of the distal and proximal heat sink supports 3160, 3162 is also thermally conductive, and the core 3164 is thermally coupled to each of the heat sink supports to transfer heat to the heat sink supports by conduction.

Like the core 1164 of the heat sink 1114, the illustrated core 3164 defines a central cavity 3170. The cavity 3170 is shaped and arranged for receiving a proximal end segment of the tube 3140D. The core 3164 has a proximal end wall 3164A that is sealingly engaged with the heat sink connector 3172 to block cooling fluid from flowing distally through the proximal end of the core into the cavity 3170. The core 3164 also includes an annular outer wall 3164B that extends distally from the proximal end wall 3164A and a plurality of circumferentially spaced apart fins 3164C that extend radially inward from the outer wall. In the illustrated embodiment each of the fins 3164C extends distally from the proximal end wall toward the distal end of the core 3164. Adjacent fins 3164C have major surfaces that are circumferentially spaced apart from one another to define gaps 3175 therebetween (see FIG. 15). As explained below, the curing device 3100 is configured to channel cooling fluid flowing along the flow path FP through the gaps 3175 between the fins, thereby transferring heat from the LED strips 3112 to the cooling fluid through the fins 3164C by conduction.

In use, the core 3164 of the heat sink 3114 conducts heat generated by the LED strips 3112 radially inward through the fins 3164C. Simultaneously, cooling fluid flows into the curing device 3110 through the cooling fluid inlet 3130 and along the cooling fluid flow path FP. The curing device 3100 directs the cooling fluid through the proximal end cap 3126 and then through the outer flow openings 3167 in the proximal heat sink support 3162. The fluid flows distally from the outer openings 3167 through the annular space between the heat sink core 3164 and the side wall 3124 and then through the outer flow openings 3165 in the distal heat sink support 3160. From the outer flow openings 3165, the fluid flows into the annular recess 3147 where the distal end cap 3140 redirects the cooling fluid to flow in a generally proximal direction. The fluid then flows proximally through the gaps 3175 along the major surfaces of the fins 3164C, and the fins transfer heat to the cooling fluid. Obstructed from further flow in the proximal direction by the end wall 3164C, the cooling fluid then flows inward through the gap 3151 between the distal end of the tube 3140D and the proximal end wall into the channel 3149. The heated cooling fluid flows distally through the channel 3149 of the tube 3140D, into the annular recess 3143 defined by the hub 3140C, and is discharged from the curing device 3100 through the outlet openings 3156 in the distal end assembly 3120.

Referring to FIGS. 16-19, another embodiment of a curing device is generally indicated at reference number 4100. The curing device 4100 is similar in many respects to the curing device 1100, and corresponding parts are given corresponding reference numbers, plus 3,000. Like the curing device 1100, the curing device 4100 can be used in the system 1010 for curing a resin-impregnated pipe liner L. The curing device 4100 includes a housing, generally indicated at 4110, which supports a plurality of LED strips 4112. The LED strips 4112 are mounted on a heat sink, generally indicated at 4114, in thermal communication with the heat sink. As described below, the illustrated curing device 4100 is configured to remove the heat generated by the LED strips 4112 by transferring the heat through the heat sink 4114 to air from the compressor 1014 that flows along a flow path FP through the interior chamber 4118 of the housing 4110.

The housing 4110 includes a distal end assembly 4120, a proximal end assembly 4122 spaced apart from the distal end assembly along an axis A, and a transparent side wall 4124 extending along the axis from the distal end assembly to the proximal end assembly to define the interior chamber 4118. The end assemblies 4120, 4122 and the side wall 4124 can have the same general features and/or configurations as the distal and proximal end assemblies 1120, 1122 and side wall 1124 of the curing device 1100 discussed above. In the illustrated embodiment, the proximal end assembly 4122 defines at least one cooling fluid inlet 4130 and the distal end assembly 4120 defines at least one cooling fluid outlet 4156. The illustrated curing device 4100 is configured to channel the air or other cooling fluid along the fluid flow path FP from the proximal cooling fluid inlet 4130 to the distal cooling fluid outlet 4156 and substantially seal the fluid flow path so that fluids only into or out of the device via the cooling fluid inlet or the cooling fluid outlet.

Like the heat sink 1114 of the curing device 1100 discussed above, the heat sink 4114 comprises a distal heat sink element 4160, a proximal heat sink element 4162, and a core 4164. In the illustrated embodiment, the proximal and distal heat sink elements 4160, 4162 function in much the same way as the heat sink elements 1160, 1162 of the curing device 1100. Thus, like the heat sink elements 1160, 1162, the heat sink elements 4160, 4162 are configured to block cooling fluid from flowing through the interior cavity 4170 of the heat sink 4114 (e.g., block fluid from flowing radially inwardly of the LED strips 4112). Each of the heat sink elements 4160, 4162 also includes a wall 4190 that sealingly engages the housing 4110 and a plurality fins 4192 that extend outwardly along the axis A from the respective wall at circumferentially spaced apart locations to define gaps 4195 therebetween. Like the heat sink elements 1160, 1162, the wall 4190 of each heat sink element 4160, 4162 defines at least one flow opening providing fluid communication between one or more of the gaps 4195 and a space in the interior chamber 4118 located between the heat sink core 4164 and the side wall 4124. Thus as explained below, the distal and proximal heat sink elements 4160, 4162 are shaped and arranged to guide cooling fluid through the gaps 4195 along the major heat transfer surfaces of the fins 4192 and through the holes 4194 as the cooling fluid flows along the flow path FP.

The core 4164 comprises a body including a distal segment 4164A having a first generally polygonal cross-sectional shape and a proximal segment 4164B having a second generally polygonal cross-sectional shape of a different configuration. Like the proximal and distal segments 1164A, 1164 of the core 1164, the proximal and distal segments 4164A, 4164B have polygonal cross-sectional shapes that are angularly offset about the axis A. Moreover, only certain ones of the flats of each of the proximal and distal segments 4164A, 4164B is configured to support an LED strip 4112. Specifically, about each of the proximal and distal segments 4164A, 4164B, every third flat does not support an LED strip and instead heat transfer fins 4197 extend radially outward from these flats. The distal and proximal segments 4164A, 4164B of the core 4164 are arranged so that the flats supporting the fins 4197 on each segment are angularly spaced apart from one another about the axis of the heat sink. (e.g., on the distal segment, fins extend from the flats at angular positions between the one-o'clock and two-o'clock positions, between the four-o'clock and five-o'clock positions, between the seven-o'clock and eight-o'clock positions, and between the ten-o'clock and eleven-o'clock positions; and on the proximal segment, fins extend from flats generally at the twelve-o'clock, three-o'clock, six-o'clock, and nine-o'clock positions, etc.). On each of the distal and proximal segments 4164A, 416B, two flats for supporting LED strips 4112 are located between the adjacent flats with the fins 4197. The angularly staggered LED strips 4112 and fins 4197 on each of the proximal and distal segments 4164A, 416B enhances the angular distribution of electromagnetic radiation from the LED strips about the axis A and the angular distribution of heat transfer capacity through the fins 4197.

In the illustrated embodiment, each of the fins 4197 has opposite major surfaces that extend generally along the axis A. On each of the respective flats, adjacent fins 4197 are spaced apart from one another to define fluid flow gaps 4199 therebetween. As explained below, the core 4164 conducts some of the heat generated by the LED strips 4112 through the fins 4197, which transfer the heat to the cooling fluid flowing along the flow path FP through the gaps 4199 by convection.

In use, the heat sink 4114 conducts heat from the LED strips 4112 to the fins 4192, 4197 extending from the distal and proximal heat sink elements 4160, 4162 and the core 4164. Simultaneously, the air compressor 1014 directs compressed air into the interior 4118 of the curing device 4100 through the inlet 4130 and along the flow path FP. From the inlet 4130, the cooling fluid flows through the gaps 4195 between the fins 4192 of the proximal heat sink element 4162. As the cooling fluid flows through the gaps 4195, it absorbs heat from the fins 4192 by convection. The fluid flows from the gaps 4195 through the openings 4194 formed in the wall 4190 into the space between the heat sink core 4164 and the housing side wall 4124. The fluid flows distally through this space, and at least some of the fluid flows through the gaps 4199 between the fins 4197. As the cooling fluid flows through the gaps 4199, it absorbs heat from the fins 4197 by convection. After reaching the distal end of the core 4164, the fluid flows through the openings 4194 in the wall 4190 of the distal heat sink element 4160 and into the gaps 4195 between the fins 4192, absorbing heat from the fins by convection. The heated fluid then flows out of the curing device 4100 through the outlet openings 4156, thereby removing some of the heat generated by the LED strips 4112 from the device.

Referring to FIGS. 20-28, another embodiment of a device for curing a liner L includes a three-part heat sink 1 formed from cylindrical copper. The heat sink 1 includes a hub 2 having a relatively small diameter D, a proximal end element including a flange 3 having a larger outer diameter D1 and fins 4 having outer points situated radially on the circumference of a circle with diameter D2. The fins 4 can function as a radiator 5 for transferring heat to air entering the curing device. The fins 4, flange portion 3, and hub 2 can be integrally formed from one piece of material. The fins 4 of the radiator can comprise rectangular plates that extend generally in radial planes and have various radial widths H and identical axial lengths K. The right end of the hub 2 is attached by means of bolts 6 (only one is shown) to a corresponding radiator 5', which comprises a flange 3' and fins 4' and represents the third part of cylindrical body 1. A bushing 7 defining twelve symmetrically spaced flat areas 8 with threaded holes 9 is mounted on the cylindrical outer surface of the hub 2. Semicircular-profile grooves 10 extend along the length of the bushing 7 between adjacent flat surfaces 8. Screws 11 attach identical laminated plastic plates 12 equipped with ten LEDs 13 configured for emitting electromagnetic radiation of selected wavelength to each of the flat surfaces 8. The LEDs 13 are arrayed in two rows of five diodes each. The plates 12, together with their diodes 13, have a length, which is shorter than length HL of hub 2.

The diodes 13 are protected by a transparent side wall 14 mounted on shoulders 15, 15' defined respectively by the flanges 3, 3' of the radiators 5, 5'. The side wall 14 can be formed from a transparent plastic, a quartz glass, etc. Each of the flanges 3, 3' also defines six threaded holes 29 that are circumferentially spaced apart adjacent the perimeter of the radiator 5 and arcuate slots 16 that are circumferentially spaced apart and positioned between adjacent ones of the threaded holes. Screws 17 extend through slots 19 formed in radial projections 20 of a proximal end cap 18 and are threadably received in the holes 29 to secure the proximal end cap to the radiator 5. The proximal end cap 18 is also fastened to a conduit fitting 21 that allows cooling air into the device and admits an electrical cable 22 connected to the diodes 13. A temperature sensor 23 mounted in the hub 2 of radiator 5 detects the temperature of the hub. A pair of radially opposite temperature sensors 24 are capable of detecting the temperature of the liner L. A sensor 25 mounted in the distal cover 26 of the device measures the temperature of the air after leaving the distal radiator 5' and just before the air is exhausted from the device. The data from the sensors 23-25 is made available to the user in real time to control operation of the device. A distal end cap 26 is attached to the heat sink 1 by screws 28 that extend through holes 27 formed in the end cap and are threadably received in the openings 29 of the flange 3' of the distal radiator 5'. In addition, a camera 32 is mounted on the distal section 30 of distal end cap 26 and protected by a transparent plate 33. Six uniform, circumferentially spaced curved slots 34 are also formed in the distal end of the cap 26. LEDs 35 are also supported on the end cap 26 under protective window 36 and a cover 37. The cover 37 further supports the transparent plate 33 protecting the camera 32. The temperature sensors 24 are also supported on the end cap 26 inside respective slots 38. A conduit 40 is mounted in an axial passage 39 extending through the fitting 21 to convey compressed air between the fins 4 of the radiator 5 and through the device. The camera 32 can be used to determine the location of the curing device during use and assess the condition of the hardening of the resin lining by electromagnetic radiation from diodes 13 both before and after the activation of these diodes.

A variation of the device for curing the resin in a pipe liner L is shown in FIGS. 29-37. In the device shown in FIGS. 29-33, the radiator 5 is cooled by an integrated ventilator rather than by remotely supplied compressed air. Thus, the proximal end cap 18' is enlarged and shaped to include a radially inwardly extending annular projection 41 defining an aperture 42 having a generally square profile with rounded corners. A ventilator 43 is shaped and arranged for being supported inside the aperture 42. In addition, the curved head of 44 of proximal end cap 18' defines six holes 45 (FIG. 31) uniformly spaced about its circumference and serving as inlets of air to ventilator 43. The ventilator forces air from the holes 45 through the device to achieve heat transfer from the LEDs 13.

Figure 27:
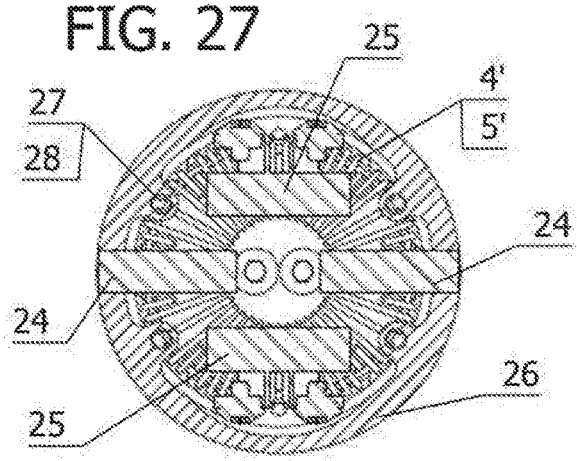
FIG. 27 is a section taken in the plane of line 27-27 of FIG. 20.
Figure 28:
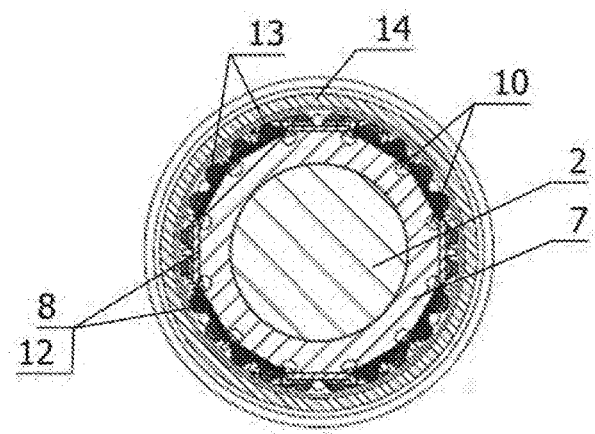
FIG. 28 is a section taken in the plane of line 28-28 of FIG. 20.
Figure 30:
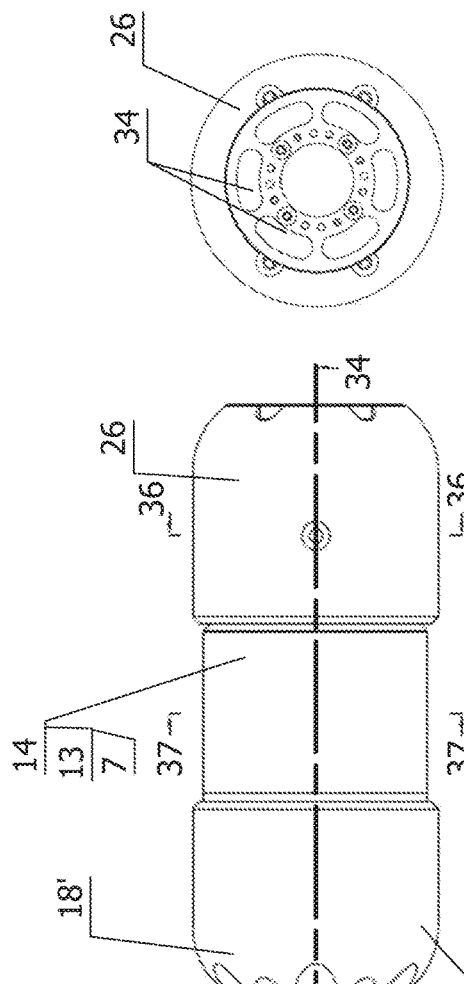
FIG. 30 is a distal end elevation of the curing device of FIG. 29.
Figure 29:
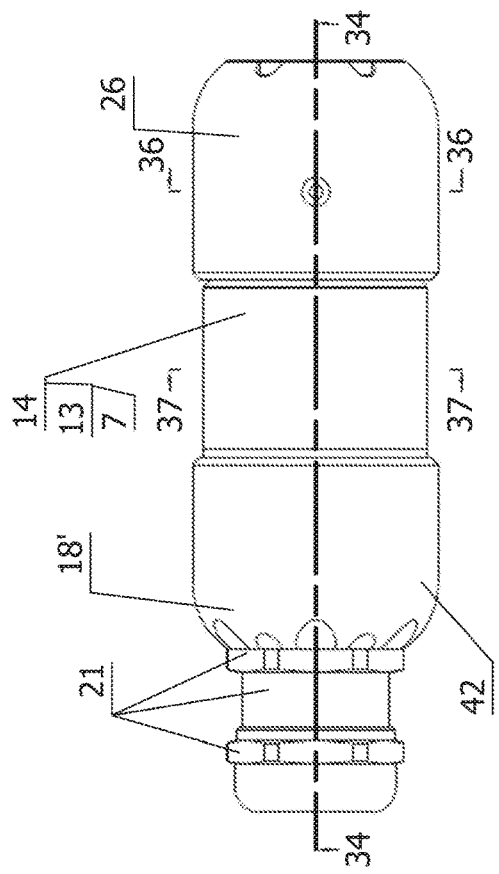
FIG. 29 is a top plan view of another embodiment of a curing device.
Figure 31:
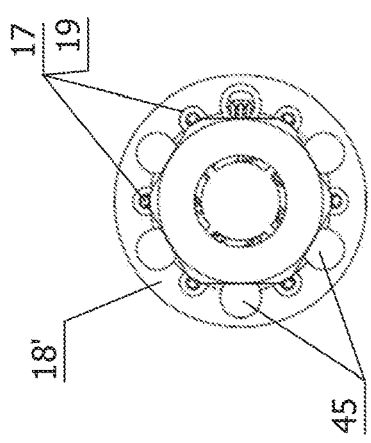
FIG. 31 is a proximal end elevation of the curing device of FIG. 29.
Figure 32:
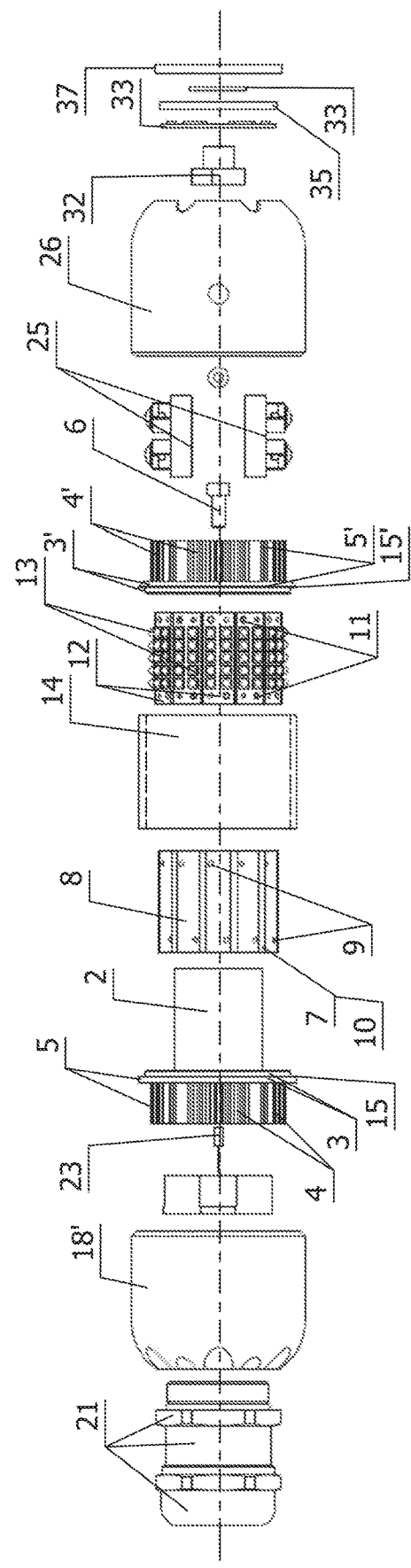
FIG. 32 is an exploded top plan view of the curing device of FIG. 29.
Figure 33:
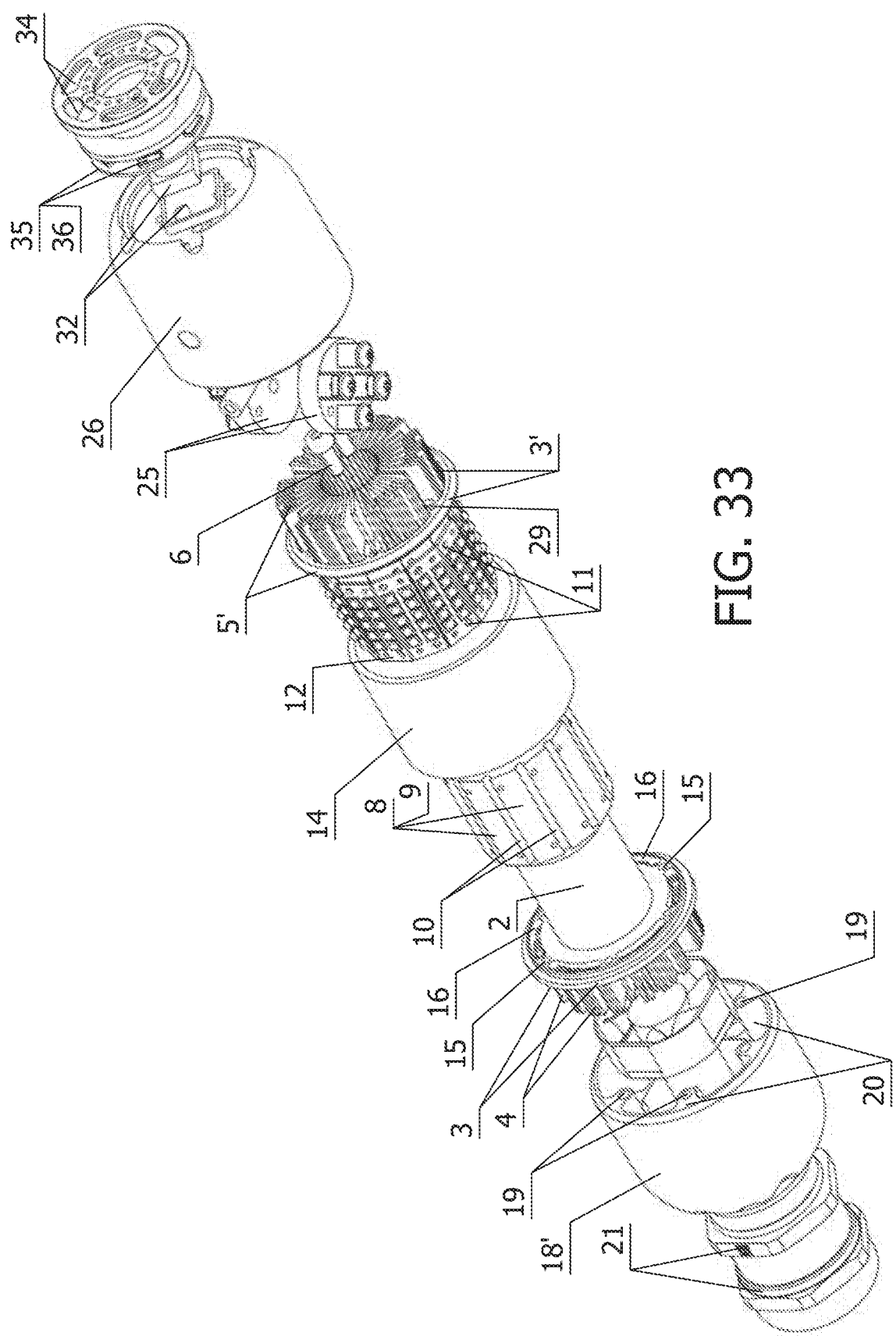
FIG. 33 is an exploded perspective of the curing device of FIG. 29.
Figure 41:
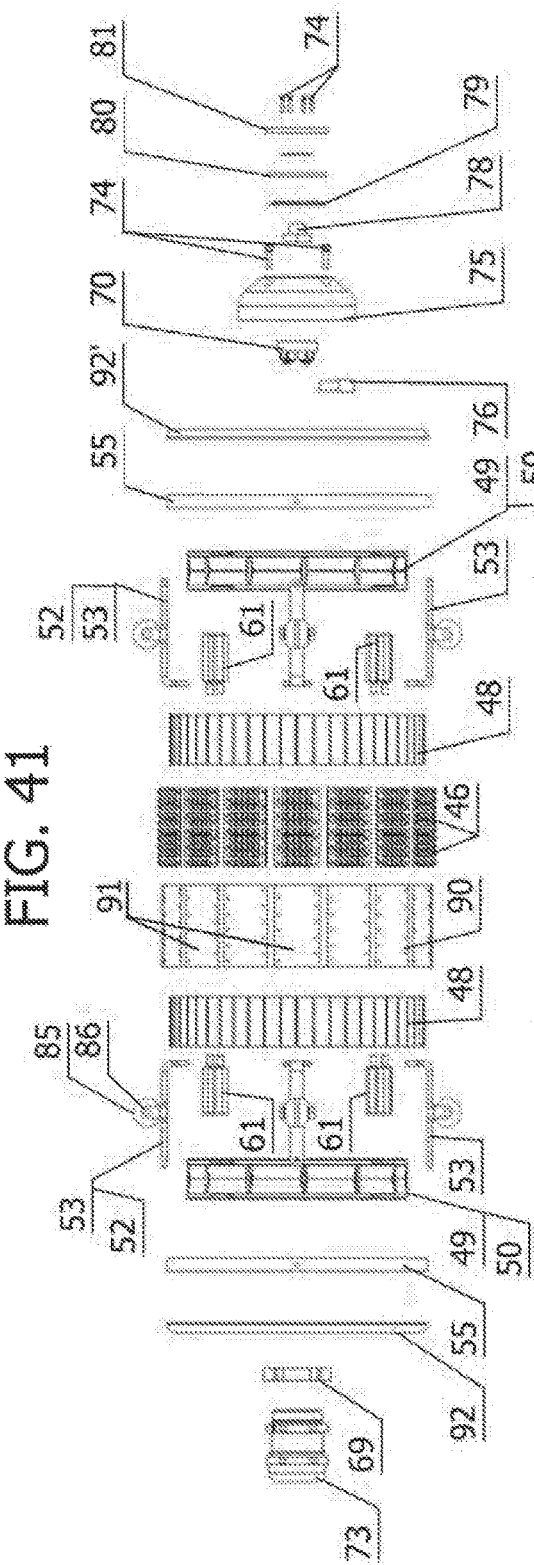
FIG. 41 is an exploded top plan view of the curing device of FIG. 38.
Figure 42:
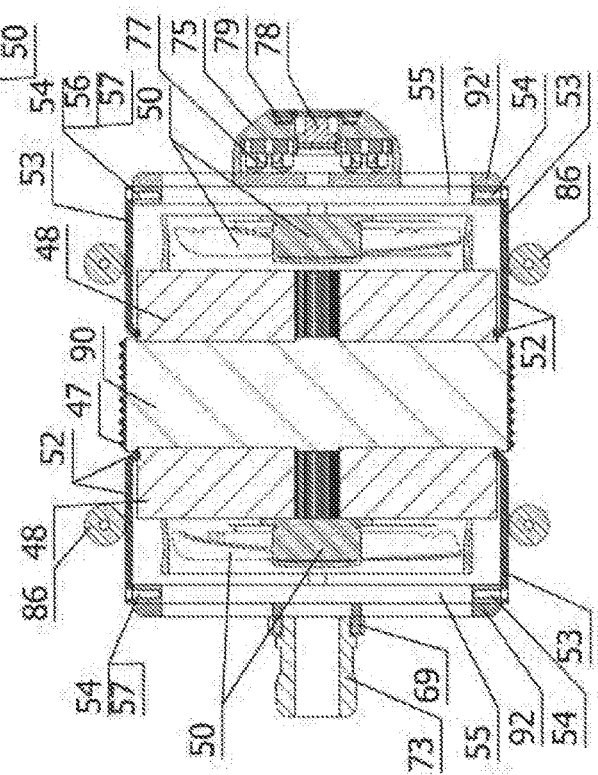
FIG. 42 is a section taken in the plane of line 42-42 of FIG. 38.
Figure 43:
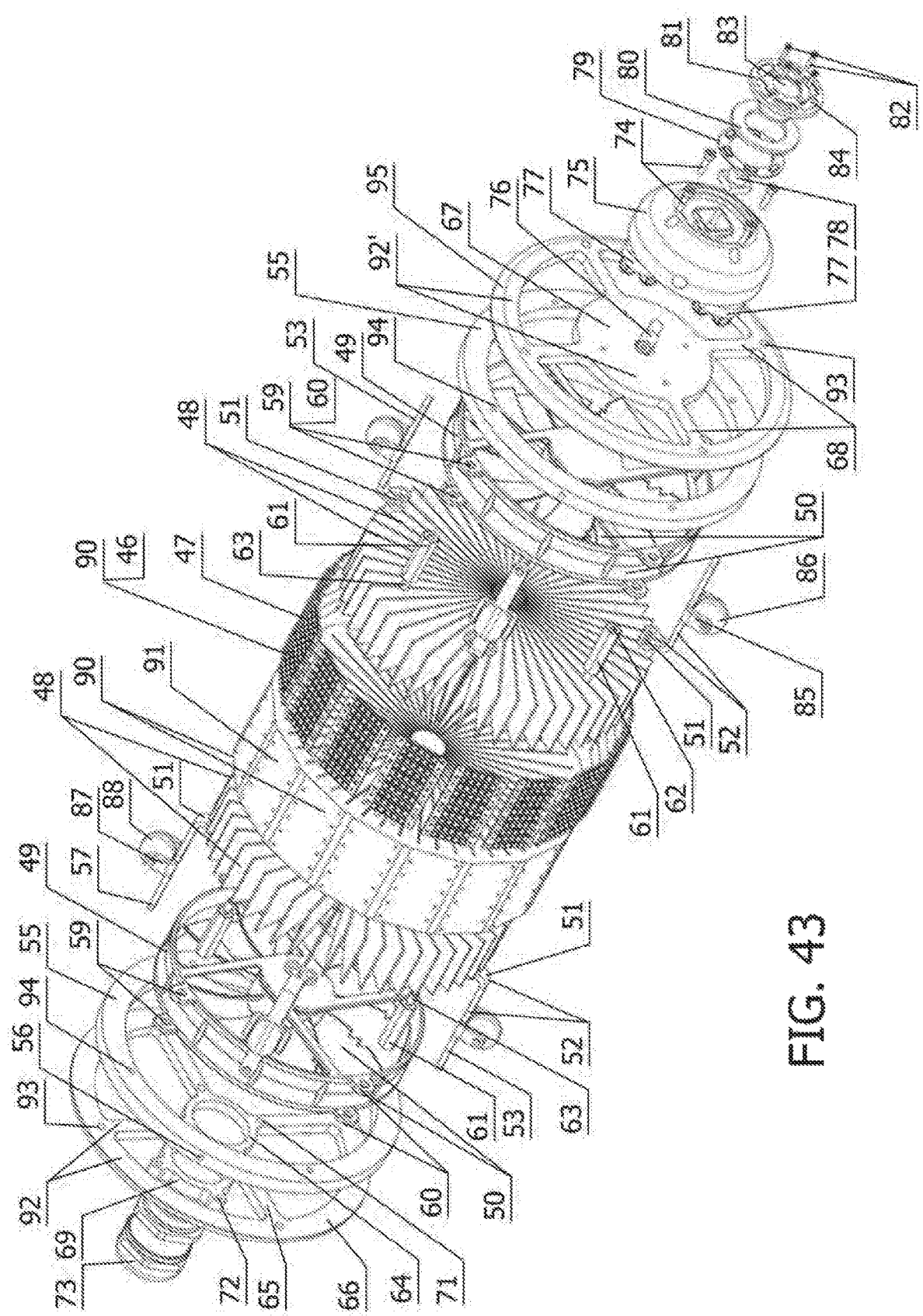
FIG. 43 is an exploded perspective of the curing device of FIG. 38.

Referring to FIGS. 38-43, another variation of the curing device differs from the second embodiment shown in FIGS. 29-27 in that it is equipped with two ventilators for cooling the radiators instead of one ventilator. The third embodiment of the design includes a heat sink core 90 joined at opposite ends to circumferentially spaced radiator fins 48. The outer surface of the core 90 defines flat areas 91, and plastic plates 46 equipped with LEDs 47 are attached to each of the flat areas of the core. Ventilators 50 at each end of the heat sink include cylindrical housings 49 having a smaller diameter than the radiator fins. The cylindrical housings 49 are fastened to the heat sink. Two brackets 52 including bifurcated bushings 51 are mounted at diametrically spaced positions on each of the proximal and distal radiator fins 48. Ends of the brackets 52 opposite the bushings 51 are fastened to proximal and distal support plates 55 by screws 54 that are received in mounting holes 56 and 57 in the support plates. In addition grills 92, 92' are also attached to the outer ends of each of the plates 55. Connecting rods 61 are fastened to the ventilator housings 49 by screws (not shown) that extend through holes 59 formed in outwardly projecting tabs 50 on the ventilator housings to secure the ventilator housing to the core 90. To facilitate this connection, one end portion of each rod 61 defines a threaded hole 62 into which is screwed a suitable screw and the opposite end portion defines a threaded shaft 63 that is screwed into threaded holes (not shown) formed in the respective end of the core 90 supporting the diodes 47. The proximal grill 92 includes an inner ring 64 that is connected to an outer ring 66 by four circumferentially spaced spokes 65 (FIG. 43). The distal grill 92' includes an inner round plate 67 that is connected to an outer ring 95 by four circumferentially spaced spokes 68. The inner ring element 64 of the proximal grill 92 is attached to a conduit 69 by screws (not shown) received in the holes 71 and 72, and a fitting 73 is fastened to the conduit 69. The round plate 67 of the distal fastener 92' is fastened by screws 74 to a camera casing 75. A temperature sensor 76 for sensing the temperature of the resin sleeve, a measurement sensor 77, and a camera 78 are supported on the casing 75. A camera cover 81 is fastened to the casing 75 over an LED ring 79 and a camera lens 80 using screws 82. Moreover, camera cover 81 defines a central hole 83 and, radially spaced from the central hole, curved slots 84. In addition, tabs 85 extend from opposite sides of each of the brackets 52 about halfway along its length to forming U-shaped channel for supporting wheels 86 for rotation therein. The wheels 86 facilitate movement of the device through the liner L.

Accordingly, aspects of the invention can provide a relatively simple design of a device for curing resin using electromagnetic radiation with considerable thermal capacity by providing a large surface area radiator configured to rapidly transfer heat from the diodes and the device. Aspects of the invention can also be implemented without the use of compressed air from a compressor, which can simplify using the device to cure the resin in relatively long pipe liners. In another aspect, using the device without a compressor can enhance the use of the device for rehabilitating relatively large diameter pipes, i.e., more than 200 mm. In another aspect, the curing devices can be linked together in use.

In certain embodiments, the curing device includes a three-part body of cylindrical copper. A large diameter flange is mounted on each end of a small diameter core, and fins extend outwardly from each flange to provide a radiator at each end of the core. On at least one end of the three-part body, the radiator is exposed to compressed air entering the device. The fins of the radiator can comprise rectangular plates of alternately varying radial widths and identical lengths. One of the flanges, which together with its ribbing forms one part of the three-part body, is attached to the core. The core defines circumferentially spaced flats separated by semi-circular grooves. The core also defines threaded holes that intersect each of the flats. Each flat is joined to a laminated plastic plate including LEDs. The flanges are connected to end caps of the device. Each flange and its adjoined fins can be formed from one piece of material. A proximal end cap can include an inner annular projection configured for supporting a ventilator, and the proximal end cap can define holes that are uniformly spaced about its circumference for use as air inlets for the ventilator.

In another embodiment of a curing device, each of the ends of the core (which defines flat areas along its circumference that individually support LED strips) is linked to a respective radiator, which in turn is connected to a ventilator housing, which in turn is connected to a support plate, which in turn is connected to a grill. Suitably, the radiators can be connected to a plurality of brackets at spaced apart circumferential positions that each include tabs extending from the sides thereof configured to mount wheels for rotation.

In an embodiment of a curing device with at least two radiators, a first radiator with radiator plates having at least two lengths is positioned adjacent a compressed air inlet of the device such that the air flows in and among the radiator plates to absorb heat. A second radiator is arranged coaxially with the first radiator. If airflow from the compressor to the first radiator breaks down, the considerable heat absorption capacity of the second radiator can prolong the operating time of the device during the absence of cooling air until the copper heat sink is heated to its critical temperature. The copper radiator can rapidly transfer heat away from the device due to the thermal properties of the material. Two temperature sensors are used to detect the temperature of the liner during curing to determine when the liner has fully cured.

In certain embodiments, the air compressor can be replaced with a ventilator such that no external air compressor is needed to cool the device. Eliminating the air compressor can reduce operating costs and also increase the operating distances over which the device can be used. Two ventilators can be operatively connected to respective radiators in one device to simplify the design and increase air flow capacity, e.g., to e.g., 300-400 m$^3$/h, thus minimizing the need for an external air compressor. The diameters of the radiators, ventilators, and diodes can be increased, and the device can be equipped with replaceable wheels to facilitate use of the device with pipes of large diameters, e.g. diameters of 200 mm or larger. Multiple devices can also be linked in series and moved over long distances inside these pipelines.

Accordingly, in one embodiment, a device for curing resin in a pipe liner includes a multipart heat sink and LEDs configured to generate electromagnetic radiation of a wavelength in an inclusive range of from 200-500 nm, which is suitable for curing the resin. The LEDs can be protected by transparent plastic or quartz glass walls. The heat sink can include ribbed metal elements functioning as radiators that absorb heat from the diodes. Furthermore, compressed air for cooling the diodes can be introduced into the curing device through an axial inlet opening in an outer housing or a ventilator can be positioned adjacent the inlet of that device cooling the diodes via the radiators. The device can include sensors of diode temperature, a monitoring camera, a conduit for carrying compressed air for cooling the diodes and diode and sensor power cables, and wheels. Furthermore, an end of the device can be hooked to a line for pulling it through the pipeline.

In one embodiment, a device for curing resin in a pipe liner includes a multipart heat sink and LEDs configured to generate electromagnetic radiation of a wavelength in an inclusive range of from 200-500 nm, which is suitable for curing the resin. The diodes can be protected by transparent plastic or quartz glass walls. The heat sink can include ribbed metal elements functioning as radiators that absorb heat from the diodes. Furthermore, compressed air for cooling the diodes can be introduced into the curing device through an axial inlet opening in an outer housing or a ventilator can be positioned adjacent the inlet of that device for cooling the diodes via the radiators. The device can include sensors of diode temperature, a monitoring camera, a conduit for carrying compressed air for cooling the diodes and diode and sensor power cables, and wheels. Furthermore, an end of the device can be hooked to a line for pulling it through the pipeline.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A curing device for curing a material impregnating a pipe liner that is curable by electromagnetic radiation in a wavelength range, the curing device comprising:
    a housing having an axis, a distal end portion and a proximal end portion spaced apart along the axis, and a side wall extending along and about the axis between the distal and proximal end portions and defining an interior chamber disposed between the distal and proximal end portions, the side wall being at least partially transparent to electromagnetic radiation in the wavelength range, the housing defining a cooling fluid inlet and a cooling fluid outlet that are each configured to provide fluid communication between the interior chamber and a location external to the housing;
    at least one light emitting diode (LED) configured for transmitting
    electromagnetic radiation in the wavelength range and supported in the interior chamber of the housing for transmitting the electromagnetic radiation through the side wall to the liner; and
    a heat sink comprising thermally conductive material disposed in the interior chamber of the housing, the heat sink being positioned within the interior chamber so that the heat sink and the housing define a fluid flow path that extends from the cooling fluid inlet to the cooling fluid outlet and includes at least a segment that is located between the heat sink and the housing, the heat sink being thermally coupled to the at least one LED for transferring heat generated by the at least one LED to a cooling fluid flowing along the fluid flow path;
    wherein the heat sink and the housing are shaped and arranged to substantially prevent the cooling fluid from flowing radially inward of the at least one LED.

2. A curing device as set forth in claim 1 wherein at least a portion of the fluid flow path is located radially outward of the heat sink.

3. A curing device as set forth in claim 1 wherein at least a portion of the fluid flow path is located radially outward of the at least one LED.

4. A curing device as set forth in claim 1 wherein the inlet is defined by one of the distal and proximal end portions of the housing and the outlet is defined by the other of the distal and proximal end portions of the housing.

5. A curing device as set forth in claim 1 wherein at least a portion of the fluid flow path has an annular cross-sectional shape extending circumferentially around at least a segment of the heat sink.

6. A curing device as set forth in claim 1 wherein the at least one LED is positioned in the fluid flow path.

7. A curing device as set forth in claim 1 wherein the heat sink includes a distal end portion adjacent the distal end portion of the housing, a proximal end portion adjacent the proximal end portion of the housing, and a core extending along the axis between the distal end portion and the proximal end portion.

8. A curing device as set forth in claim 7 wherein at least one of the distal and proximal end portions of the heat sink defines a plurality of spaced apart fins defining gaps therebetween, a portion of the fluid flow path extending through the gaps.

9. A curing device as set forth in claim 8 wherein said at least one of the distal and proximal end portions of the heat sink comprises a radially extending wall extending radially outward with respect to the core of the heat sink, the plurality of spaced apart fins extending axially from the radially extending wall.

10. A curing device as set forth in claim 7 wherein the core of the heat sink has an exterior surface comprising a distal segment having a first substantially polygonal cross-sectional shape and a proximal segment having a second substantially polygonal cross-sectional shape having a different configuration than the distal segment.

11. A curing device as set forth in claim 10 wherein each of the first and second substantially polygonal cross-sectional shapes has an angular orientation with respect to the axis and the second substantially polygonal cross-sectional shape is substantially identical to the first substantially polygonal shape except that the angular orientation of the second substantially polygonal cross-sectional shape is offset from the angular orientation of the first substantially polygonal cross-sectional shape.

12. A curing device as set forth in claim 7 wherein the core of the heat sink has an exterior surface and the at least one LED is arranged around the core of the heat sink to substantially cover the exterior surface.

13. A curing device as set forth in claim 7 wherein the curing device is configured to remove a substantial portion of the heat generated by the at least one LED by transferring heat in a thermal series comprising:
   conduction of heat from the at least one LED to the core of the heat sink;
   conduction of heat from the core to the distal and proximal end portions of the heat sink; and
   convection of heat from the distal and proximal end portions of the heat sink to the cooling fluid flowing along the fluid flow path.

14. A system for curing the pipe liner comprising a curing device as set forth in claim 1 and a source of compressed air configured to be fluidly coupled to the cooling fluid inlet.

15. A method for curing a pipe liner impregnated with a material that is curable by electromagnetic radiation in a wavelength range, the method comprising: positioning a curing device in an interior of the liner;
   moving the curing device having a housing positioned in the interior of the liner along a length of the liner;
   during the step of moving the curing device, emitting electromagnetic radiation having a wavelength in the wavelength range through the housing toward the liner from a light emitting diode (LED) of the curing device received in an interior chamber of the housing;
   during the step of emitting the electromagnetic radiation from the LED, removing heat from the LED by conveying the heat from the LED to a cooling fluid through a heat sink of the curing device on which the LED is mounted in the interior chamber of the housing; and
   during the steps of emitting the electromagnetic radiation from the LED and removing heat from the LED, delivering the cooling fluid
      into the interior chamber of the housing through an inlet formed in the housing, out of the interior chamber of the housing through an outlet formed in the housing at a location spaced apart from the inlet, and
      from the inlet to the outlet along a fluid flow path including at least a portion positioned between the housing and the heat sink, the cooling fluid being substantially prevented from flowing radially inward of the LED along the portion of the fluid flow path positioned between the housing and the heat sink.

16. A curing device for curing a material impregnating a pipe liner that is curable by electromagnetic radiation in a wavelength range, the curing device comprising:
   a housing having an axis, a distal end portion and a proximal end portion spaced apart along the axis, and a side wall extending along and about the axis between the distal and proximal end portions and defining an interior chamber disposed between the distal and proximal end portions, the side wall being at least partially transparent to electromagnetic radiation in the wavelength range, the housing defining a cooling fluid inlet and a cooling fluid outlet that are each configured to provide fluid communication between the interior chamber and a location external to the housing;
   light emitting diodes (LEDs) configured for transmitting electromagnetic radiation in the wavelength range and supported in the interior chamber of the housing for transmitting the electromagnetic radiation through the side wall to the liner; and
   a heat sink comprising thermally conductive material disposed in the interior chamber of the housing, the heat sink including an LED supporting portion, the LEDs being disposed on the LED supporting portion and in thermal communication with the heat sink, the heat sink being positioned within the interior chamber so that the heat sink and the housing define a fluid flow path that extends from the cooling fluid inlet to the cooling fluid outlet, the heat sink including a first heat sink element axially spaced from the LED supporting portion and the LEDs disposed thereon, the first heat sink element having passaging therein for receiving cooling fluid flowing along the fluid flow path, the LED mounting portion being free of passaging in fluid communication with the fluid flow path.

17. A curing device as set forth in claim 16 wherein the heat sink further comprises a second heat sink element axially spaced from the LED supporting portion and the first heat sink element, the second heat sink element having passaging therein for receiving the cooling fluid flowing along the fluid flow path.

18. A curing device as set forth in claim 17 wherein the first and second heat sink elements are configured to direct the cooling fluid flowing along the fluid flow path between the LED supporting portion and the side wall of the housing.

* * * * *